United States Patent
Zhao et al.

(10) Patent No.: US 12,187,922 B2
(45) Date of Patent: Jan. 7, 2025

(54) PSA COMPOSITION WITH ULTRA-LOW TEMPERATURE PERFORMANCE

(71) Applicant: Avery Dennison Corporation, Glendale, CA (US)

(72) Inventors: Ke Zhao, Shanghai (CN); Yurun Yang, Shanghai (CN)

(73) Assignee: Avery Dennison Corporation, Mentor, OH (US)

(*) Notice: Subject to any disclaimer, the term of this patent is extended or adjusted under 35 U.S.C. 154(b) by 681 days.

(21) Appl. No.: 17/433,372

(22) PCT Filed: Feb. 26, 2019

(86) PCT No.: PCT/CN2019/076142
§ 371 (c)(1),
(2) Date: Aug. 24, 2021

(87) PCT Pub. No.: WO2020/172791
PCT Pub. Date: Sep. 3, 2020

(65) Prior Publication Data
US 2022/0169900 A1    Jun. 2, 2022

(51) Int. Cl.
C09J 133/08   (2006.01)
C09J 7/22     (2018.01)
C09J 7/38     (2018.01)

(52) U.S. Cl.
CPC .............. *C09J 133/08* (2013.01); *C09J 7/22* (2018.01); *C09J 7/385* (2018.01); *C09J 2433/00* (2013.01)

(58) Field of Classification Search
None
See application file for complete search history.

(56) References Cited

U.S. PATENT DOCUMENTS

| | | | |
|---|---|---|---|
| 4,762,888 A | 8/1988 | Sun et al. | |
| 4,879,178 A | 11/1989 | Sun et al. | |
| 5,876,745 A * | 3/1999 | Muraoka | A61L 15/58 424/443 |
| 6,153,288 A | 11/2000 | Shih et al. | |
| 7,462,390 B2 | 12/2008 | Kim et al. | |
| 7,927,703 B2 | 4/2011 | Xia et al. | |
| 8,137,807 B2 | 3/2012 | Clapper et al. | |
| 8,258,240 B2 | 9/2012 | Suzuki et al. | |
| 8,299,182 B2 | 10/2012 | Inokuchi et al. | |
| 8,445,597 B2 | 5/2013 | Tomita | |
| 8,664,326 B2 | 3/2014 | Lee et al. | |
| 8,828,539 B2 | 9/2014 | Hirose et al. | |
| 8,846,813 B2 | 9/2014 | Natsui et al. | |
| 9,011,995 B2 | 4/2015 | Park et al. | |
| 9,029,468 B2 | 5/2015 | Inui et al. | |
| 9,464,212 B2 | 10/2016 | Jeong et al. | |
| 9,828,533 B2 | 11/2017 | Zhang | |
| 10,266,629 B2 | 4/2019 | Inui et al. | |
| 2006/0036040 A1 | 2/2006 | Takeko et al. | |
| 2006/0234074 A1 | 10/2006 | Yun et al. | |
| 2011/0033700 A1 | 2/2011 | Caylus | |
| 2013/0005911 A1 | 1/2013 | Okamoto et al. | |
| 2013/0052457 A1 | 2/2013 | Inui et al. | |
| 2013/0071656 A1 | 3/2013 | Yamagata et al. | |
| 2013/0274419 A1 | 10/2013 | Okamoto et al. | |
| 2014/0037951 A1 | 2/2014 | Shigetomi et al. | |
| 2014/0057091 A1 | 2/2014 | Krawinkel et al. | |
| 2014/0298862 A1 * | 10/2014 | Yang | B24B 37/20 428/354 |
| 2015/0132567 A1 | 5/2015 | Shimokuri et al. | |
| 2016/0108295 A1 | 4/2016 | Ma et al. | |
| 2017/0312852 A1 | 11/2017 | Brehm et al. | |
| 2019/0002734 A1 | 1/2019 | Zhang | |
| 2019/0160797 A1 | 5/2019 | Sakairi et al. | |
| 2019/0194507 A1 | 6/2019 | Chiba et al. | |

FOREIGN PATENT DOCUMENTS

| | | |
|---|---|---|
| CN | 1993440 | 7/2007 |
| CN | 100551985 | 10/2009 |
| CN | 100580044 | 1/2010 |
| CN | 101978014 | 2/2011 |
| CN | 101996521 | 3/2011 |
| CN | 101331202 | 7/2011 |
| CN | 102220097 | 10/2011 |
| CN | 101490195 | 11/2011 |
| CN | 101511961 | 1/2012 |
| CN | 103013398 | 4/2013 |
| CN | 101724366 | 11/2013 |
| CN | 103562333 | 2/2014 |
| CN | 103571405 | 2/2014 |

(Continued)

OTHER PUBLICATIONS

Adhesives & Sealants Industry, "Manufacturing Pressure-Sensitive Adhesive Products: A Coating and Laminating Process," downloaded from https://www.adhesivesmag.com/articles/86079-manufacturing-pressure-sensitive-adhesive-products-a-coating-and-laminating-process, Apr. 1, 2005, 5 pages.

International Search Report and Written Opinion dated Oct. 30, 2019 issued in corresponding IA No. PCT/CN2019/076142 filed Feb. 26, 2019.

International Preliminary Report on Patentability dated Aug. 25, 2021 issued in corresponding IA No. PCT/CN2019/076142 filed Feb. 26, 2019.

(Continued)

*Primary Examiner* — Sheeba Ahmed

(57) ABSTRACT

Provided herein is a pressure sensitive adhesive (PSA) comprising two different acrylate polymers and a metal chelating agent to produce the PSA. The PSAs produced according to the methods described herein can be used under a broad range of working temperatures, i.e., from −99° C. to 40° C., e.g., −40° C. to 37° C. These PSAs demonstrate optimal tack and cohesiveness and/or resistance to warm water bath, when affixed to substrates.

44 Claims, 1 Drawing Sheet

(56) References Cited

FOREIGN PATENT DOCUMENTS

| | | |
|---|---|---|
| CN | 103635556 | 3/2014 |
| CN | 103694914 | 4/2014 |
| CN | 102933677 | 2/2015 |
| CN | 102757735 | 6/2015 |
| CN | 102822296 | 9/2015 |
| CN | 102732190 | 11/2015 |
| CN | 102373028 | 3/2016 |
| CN | 103270126 | 3/2016 |
| CN | 104334664 | 4/2016 |
| CN | 106928865 | 7/2017 |
| CN | 107022329 | 8/2017 |
| CN | 107629741 | 1/2018 |
| CN | 106459706 | 2/2019 |
| CN | 109310078 | 2/2019 |
| EP | 1869135 | 2/2010 |
| EP | 1631637 | 5/2010 |
| EP | 2256174 | 12/2010 |
| EP | 1737921 | 3/2011 |
| EP | 1969078 | 10/2011 |
| EP | 2048214 | 1/2012 |
| EP | 2177583 | 12/2012 |
| EP | 2385089 | 1/2013 |
| EP | 2553032 | 4/2014 |
| EP | 2730630 | 5/2014 |
| EP | 2810998 | 12/2014 |
| EP | 3122833 | 2/2017 |
| EP | 3147339 | 3/2017 |
| EP | 2551319 | 5/2017 |
| WO | 2008/116033 | 9/2008 |
| WO | 2011/119363 | 9/2011 |
| WO | 2012/128294 | 9/2012 |
| WO | 2015/143649 | 10/2015 |
| WO | 2017/116723 | 7/2017 |
| WO | 2018/025895 | 2/2018 |
| WO | 2018/043624 | 3/2018 |

\* cited by examiner

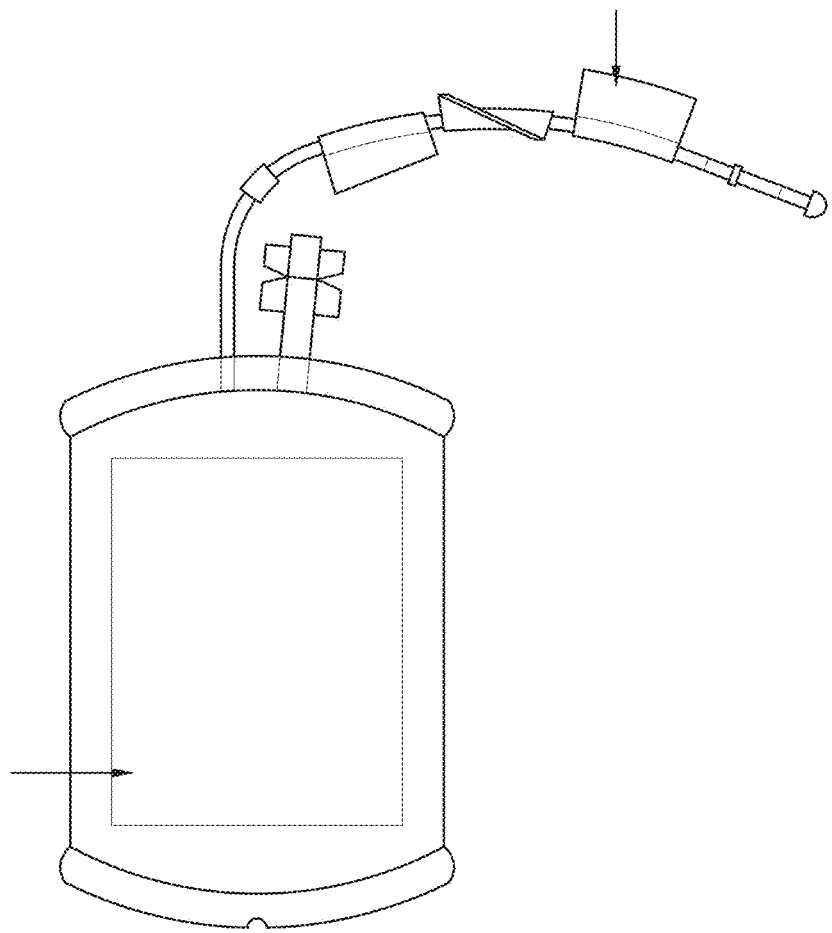

PSA COMPOSITION WITH ULTRA-LOW TEMPERATURE PERFORMANCE

CROSS-REFERENCE TO RELATED APPLICATION(S)

This application is a 371 of International Application No. PCT/CN2019/076142, which was published in English on Sep. 3, 2020, which is incorporated herein by reference in its entirety.

FIELD

The present disclosure relates generally to pressure-sensitive adhesives (PSAs), in particular, to PSAs with improved low temperature performance and improved water resistance. This application also relates to labels containing the improved PSAs as well as to methods of producing the PSAs and the labels.

BACKGROUND

PSAs are known to provide instantaneous adhesion to the substrate when subjected to pressure. PSAs are generally easy to handle in solid form and have a long shelf-life, so they are widely used for the manufacture of, for example, self-adhesive labels. However, labeling low-temperature articles, such as blood packages that have been kept at ultra-low temperature of less than −40° C., has been challenging due to the stringent requirements for these applications. For example, the labels must be able to be affixed to frozen blood packages and their tubings under these ultra-low temperatures. The labeled packages also need to be stored under ultra-low temperature for a long period. In use, these blood packages need to be pre-thawed under relatively low temperature, e.g., 2-4° C. (the pre-thaw stage) and then thawed at 37° C. (the thawing stage) e.g., by being submerged in a warm water bath. These procedures subject the labels to a wide range of temperatures, including harsh, ultra-low temperatures, and to adverse environment of being underwater. During these procedures, the labels often become loose and detach from the packages.

Although efforts have been made in the industry to create adhesives that can be functional under these conditions, the results are still far from ideal. For example, these adhesives have to be produced in a way to keep them very soft, in order to maintain their ability to attach to the packages under ultra-low temperatures. As a result, the adhesive often overflows after being applied to substrates, which adversely affects printing quality. During the pre-thawing and thawing stages, the labels on the tubing of the packages often stretch out and become detached from the package. In addition, the application of labels under ultra-low temperatures is also burdensome in that the frozen icy layer on the substrate must be first removed from the package before the label can be affixed. Thus, a need remains to produce a PSA that can perform to its intended purposes despite of these adverse conditions.

BRIEF DESCRIPTION OF THE DRAWINGS

FIG. 1 shows a blood package with labels comprising the PSA of the invention. The arrows indicate the labels that have been attached to the package and the tubing.

SUMMARY

This disclosure provides a pressure sensitive adhesive comprising: a polyacrylate base polymer having a glass transition temperature, a polyacrylate tackifier having a glass transition temperature, and a metal chelating cross-linker, wherein both the glass transition temperature of the polyacrylate tackifier and the glass transition temperature of the polyacrylate base polymer are lower than 90° C., and wherein the glass transition temperature of the polyacrylate base polymer is lower than the glass transition temperature of the polyacrylate tackifier.

In some embodiments, the pressure sensitive adhesive is a solvent-borne PSA. In some embodiments, the glass transition temperature of the polyacrylate base polymer ranges from −99° C. to −20° C. In some embodiments, the glass transition temperature of the polyacrylate tackifier is greater than −30° C., e.g., ranging from −30° C. to 90° C. In some embodiments, the glass transition temperature of the polyacrylate base polymer ranges from −50° C. to −35° C. In some embodiments, the Tg of the polyacrylate base polymer is 5° C. to 100° C. lower than that of the polyacrylate tackifier.

In some embodiments, the molecular weight of the polyacrylate base polymer is greater than the molecular weight of the polyacrylate tackifier. In some embodiments, the polyacrylate base polymer has a Mw (weight average molecular weight) ranging from 200,000~1,500,000 g/mol.

In some embodiments, the polyacrylate base polymer is present in an amount ranging from 30 wt. % to 99.9 wt. %, based on the total solid weight of the pressure sensitive adhesive In some embodiments, the polyacrylate base polymer is selected from the group consisting of 3-4229,3422,3468, and 3462A from Taizhou Yade Adhesive company; BPS 5296, BPS5330W, BPS5448 from Toyo Ink; Etrac 77313, Etrac 7043 from Eternal; Ultra Redo 109A, Ultral Redo 236A from Henkel; and Y-1220, and Y-180314X from YASUSA.

In some embodiments, the polyacrylate tackifier has a weight average molecular weight ranging from 10,000 to 300,000 g/mol. In some embodiments, the polyacrylate tackifier is present in an amount ranging from 0.5 wt. % to 30 wt. %, based on the total solid weight of the pressure sensitive adhesive. In some embodiments, the polyacrylate base polymer comprises less than 2 wt. % rosin resin, aziridine, or epoxy or combinations thereof. In some embodiments, pressure sensitive adhesive demonstrates a peel strength greater than 11.5N/inch on polyvinyl chloride, as measured by FINAT Test Method 1 (2018).

In some embodiments, the pressure sensitive adhesive demonstrates a shear greater than 5,000 minutes (e.g. greater than 8,000 minutes) on stainless steel according to FINAT 2018. In some embodiments, the pressure sensitive adhesive has a peel strength on polyvinyl chloride ranging from 5 N/inch to 20 N/inch. In some embodiments, the pressure sensitive adhesive is capable of remaining attached to a substrate when the pressure sensitive adhesive has been subjected to a temperature ranging from −99° C. to −20° C. for a period of 1 month to 10 years. In some embodiments, the pressure sensitive adhesive is capable of remaining attached to a substrate when the pressure sensitive adhesive has been subjected to a temperature ranging from 20° C. to 40° C. for a period of 0.5 hours to 24 hours. In some embodiments, the pressure sensitive adhesive is capable of remaining attached to a substrate when the pressure sensitive adhesive has been in contact with water for a period of 0.5 hour to 24 hours.

In some embodiments, the metal chelating agent is a triple aluminum comprising the structure of the formula below:

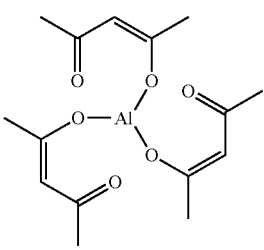

In some embodiments, the metal chelating agent is present in an amount ranging from 0.1 wt. % to 5 wt. %, based on the total solid weight of the pressure sensitive adhesive.

In some embodiments, the glass transition temperature of the polyacrylate base polymer ranges from −50° C. to −40° C. and the molecular weight of the polyacrylate base polymer ranges from 350,000 g/mol to 450,000 g/mol, and wherein the glass transition temperature of the polyacrylate tackifier ranges from −30° C. to 50° C. and the molecular weight of the polyacrylate tackifier ranges from 10,000 g/mol to 300,000 g/mol.

In some embodiments, the glass transition temperature of the polyacrylate base polymer ranges from −99° C. to −20° C. and the molecular weight of the polyacrylate base polymer ranges from 200,000 g/mol to 1,500,000 g/mol wherein the polyacrylate base polymer is present in an amount ranging from 30 wt. % to 90 wt. %, based on the total solid weight of the pressure sensitive adhesive; wherein the glass transition temperature of the polyacrylate tackifier ranges from −35° C. to −50° C. and the molecular weight of the polyacrylate tackifier ranges from 10,000 g/mol to 300,000 g/mol, wherein the polyacrylate tackifier is present in an amount ranging from 1 wt. % to 10 wt. % based on the solid weight of the pressure sensitive adhesive; and wherein the metal chelating crosslinker is present in an amount of 0.1 wt. % to 5 wt. %.

In some embodiments, the glass transition temperature of the polyacrylate base polymer ranges from −50° C. to −40° C. and the molecular weight of the polyacrylate base polymer ranges from 350,000 g/mol to 450,000 g/mol; wherein the polyacrylate base polymer is present in an amount ranging from 92 wt. % to 98 wt. %.%, based on the total solid weight of the pressure sensitive adhesive; wherein the glass transition temperature of the polyacrylate tackifier ranges from −30° C. to 50° C. and the molecular weight of the polyacrylate tackifier ranges from 10,000 g/mol to 300,000 g/mol, (e.g., 100,000 g/mol to 200,000 g/mol); wherein the polyacrylate tackifier is present in an amount ranging from 4 wt. % to 10 wt. % based on the solid weight of the pressure sensitive adhesive; wherein the metal chelating crosslinker is present in an amount ranging from 0.8 wt. % to 1.2 wt. %; and wherein the pressure sensitive adhesive demonstrates a peel strength of at least 11.5N/inch to 30 N/inch on polyvinyl chloride, as measured by FINAT-1 (2018) and a static shear on stainless steel of 5,000 minutes to 15,000 minutes, as measured by FINAT-8 (2018).

In some embodiments, wherein the glass transition temperature of the polyacrylate base polymer ranges from −50° C. to −40° C. and the molecular weight of the polyacrylate base polymer ranges from 350,000 g/mol to 450,000 g/mol; wherein the polyacrylate base polymer is present in an amount ranging from 92 wt. % to 98 wt. %.%, based on the total solid weight of the pressure sensitive adhesive; wherein the glass transition temperature of the polyacrylate tackifier ranges from −30° C. to 50° C. (e.g., from −15° C. to −8° C.) and the molecular weight of the polyacrylate tackifier ranges from 10,000 g/mol to 300,000 g/mol (e.g., 100,000 g/mol to 200,000 g/mol); wherein the polyacrylate tackifier is present in an amount ranging from 4 wt. % to 10 wt. % based on the solid weight of the pressure sensitive adhesive; wherein the metal chelating crosslinker is present in an amount ranging from 0.8 wt. % to 1.2 wt. %; and wherein the pressure sensitive adhesive demonstrates a peel strength of at least 11.7 N/inch to 30 N/inch on polyvinyl chloride, as measured by FINAT-1 (2018) and a static shear on stainless steel of greater than 5,000 minutes, as measured by FINAT-8 (2018); wherein the pressure sensitive adhesive is capable of remaining attached to a substrate when the pressure sensitive adhesive has been subjected to a temperature ranging from −40° C. to 37° C. for a period of 0.5 hour to 10 years (e.g., at −40° C. to 0° C. for 10 years); and wherein the pressure sensitive adhesive is capable of remaining attached to a substrate when the pressure sensitive adhesive is has been in contact with water for a period of 0.5 hour to 1 month, e.g., a period of 0.5 hour to 1 week, a period of 0.5 hour to 3 days.

This disclosure provides a laminate composition comprising a facestock layer and a pressure sensitive adhesive layer comprising the pressure sensitive adhesive of any one of pressure sensitive adhesive as disclosed above. In some embodiments, the pressure sensitive adhesive layer has a thickness ranging from 8 μm to 80 μm.

In some embodiments, the facestock layer is a film comprising one or more resins selected from the group consisting of polyester, polypropylene(PP), PP synthesis paper, polyvinyl chloride (PVC), ABS, polyacrylate, polycarbonate (PC), polyamide, polyimide (PI), polyamidoimide, polyacetal, polyphenylene oxide (PPO), polysulfone, polyethersulfone (PES), polyphenylene sulfide, polyether ether ketone (PEEK), polyetherimide (PE1), metallized polyethylene terephthalate (PET), polyvinyl fluoride (PVF), polyethylene ether (PEE), fluorinated ethylene propylene (FEP), polyurethane (PUR), liquid crystal polymers (LCPs, class of aromatic polyester), polyvinylidene fluoride (PVDF), aramid fibers, DIALAMY, (polymer alloys), polyethylene naphthalate (PEN), ethylene/tetrafluoroethylene, (E/TFE), polyphenyl sulfone (PPSU). In some embodiments, the laminate further comprises a topcoat layer disposed on top of the facestock layer.

Also provided is a label comprising the pressure sensitive adhesive described above or the laminate composition described above.

Also provided is a process for producing a pressure sensitive adhesive, the process comprising: dissolving in a solvent a) a polyacrylate base polymer; b) a polyacrylate tackifier; and c) a metal chelating crosslinker to form a pressure sensitive adhesive solution. In some embodiments, the solvent is selected from the group consisting of toluene, ethyl acetate, isopropanol, xylene, n-hexane, n-heptane, methyl cyclohexane, butyl acetate, acetone, butanone, and 2-Acetoxy-1-methoxypropane. In some embodiments, the method further comprises the step of coating a facestock with the pressure sensitive adhesive solution, and drying the pressure sensitive adhesive solution to produce a label.

In some embodiments, the method further comprises applying the label to an article to produce a labeled article, wherein the label is capable of remaining attached to the article after the labeled article has been kept under a temperature that ranges from −99° C. to 40° C. for a period at least 8 hours and/or the label is capable of remaining attached to the article after the label has been in contact with water for a period of at least 0.5 hour.

Also provided is a process for applying a pressure sensitive adhesive to an article, the process comprising applying the label produced in any of the processes above to the article at an application temperature equal to or less than −40° C. In some embodiments, the article is a frozen blood product package.

In some embodiments, the glass transition temperature of the polyacrylate base polymer is less than the application temperature.

In some embodiments, the pressure sensitive adhesive demonstrates a peel strength of at least 11.7 N/inch to 30 N/inch on polyvinyl chloride, as measured by FINAT Test Method 1 (2018) and a static shear on stainless steel of greater than 8000 minutes.

In some embodiments, the pressure sensitive adhesive remains attached to the article after subjecting to a temperature ranging from −40° C. to 40° C.

In some embodiments, the pressure sensitive adhesive remains attached to the substrate after contact with water for a period of 0.5 hour to 1 month.

Also provided is a pressure sensitive adhesive solution comprises the components of any of the pressure sensitive adhesive as described above, and a solvent. In some embodiments, the polyacrylate base polymer solution is present in an amount ranging from 30 wt. % to 90 wt. % (e.g. 60 wt % to 90 wt. %) based on the total weight of the pressure sensitive adhesive solution. In some embodiments, the solvent is present in an amount ranging from 10 wt. % to 70 wt. % based on the total weight of the pressure sensitive adhesive solution.

DETAILED DESCRIPTION

The present invention relates generally to pressure sensitive adhesives (PSAs). The PSAs of this disclosure comprise two different acrylate polymers and a metal chelating agent and can be effectively used under a broad range of working temperatures, e.g., from −99° C. to 40° C. or from −40° C. to 37° C. As some benefits, these PSAs demonstrate optimal tack and cohesiveness and/or resistance to warm water bath, when affixed to substrates.

As noted herein, a variety of conventional PSAs are known in the art. Many of these adhesives, however, do not demonstrate desired performance for labeling low temperature substrates or desired water resistance.

U.S. Pat. No. 8,258,240B2 discloses a PSA that comprises two polyacrylate polymers L and H, however the polymer H has a high glass transition temperature, i.e., in the range of between 30° C. and 120° C. Thus the PSA is not suitable for use under ultra-low temperatures.

U.S. Pat. No. 4,879,178A discloses a PSA, comprising a copolymer having a low glass transition temperature in the range of −20° C. to −80° C. and another copolymer having a high glass transition temperature in the range of 10° C. to 40° C. However, the PSA is a hot melt PSA, not a solvent-borne PSA. In addition, the PSA does not contain metal chelating crosslinker. These differences render the PSA, unlike the claimed PSA, unable to perform well under ultra-low temperatures or after being exposed to warm water-bath.

The inventors have found that the unique combination of specific components—a particular polyacrylate base polymer, a polyacrylate tackifier, and a metal chelating agent crosslinker—surprisingly demonstrate a synergistic balance of high peel strength and static shear. Importantly, it has been discovered that when the glass transition temperatures ("$T_g$") of both polyacrylate base polymer and a polyacrylate tackifier are lower than 30° C. and the glass transition temperature of the polyacrylate base polymer is less than the glass transition temperature of the tackifier, the PSAs show good performance under ultra-low temperature and/or excellent resistance to warm water bath, which was previously unattainable with existing PSAs.

Without being bound by theory, it is postulated that the lower $T_g$ (and optionally higher molecular weight) polyacrylate provides for low temperature attachment, while the higher $T_g$ (and optionally lower molecular weight) polyacrylate may serve as a tackifier and thus provide for a surprising increase in tack performance. Importantly, due to the synergies of the components, the presence of the higher $T_g$ polyacrylate allows the use of lesser amounts thereof, which provides processing and economic benefits. It also provides the unexpected benefit of reducing or eliminating the need for rosin resin, which has been found to create problems associated hardening of the PSA, which impairs the ability of attaching to the substrate under ultra-low temperature and the poor resistance to warm water bath. In addition, it has been found that the use of the aforementioned higher $T_g$ polyacrylate, also unexpectedly improves water resistance in the PSA, without sacrificing other performance characteristics. It is believed that the specific higher $T_g$ polyacrylate may have a higher degree of cohesiveness, which contributes to the water resistance improvements. Further, the use of specific crosslinkers has been found to significantly increase both cohesiveness of the polymer and resistance to warm water bath. Importantly, the use of these particular crosslinkers also surprisingly has minimal, if any negative impact on the PSA's low temperature adhesion. The increase in the cohesiveness also reduces the problem of overflow of the adhesive and eases die cutting.

All ranges and limits referenced in this disclosure include end points.

Polyacrylate Polymer

The PSA disclosed herein comprises two polyacrylate polymers, one polyacrylate polymer is more abundant, referred to herein as the "polyacrylate base polymer;" the other polyacrylate polymer is present in a lesser amount and may serve as a tackifier, referred to herein as the "polyacrylate tackifier." In some embodiments, the polyacrylate base polymer used herein typically has a molecular weight greater than that of the polyacrylate tackifier. The polyacrylate base polymer may also have $T_g$ lower than that of the polyacrylate tackifier. As discussed above, the use of the polyacrylate polymers has been found to contribute to the benefits mentioned above. In some embodiments, both the $T_g$ of the polyacrylate base polymer and the $T_g$ of the polyacrylate tackifier are lower than 30° C., e.g., lower than 20° C., lower than 10° C., lower than 0° C., or lower than −5° C.

The average molecular weight of the polyacrylate base polymer may vary widely. In some embodiments, the average molecular weight may range from 200,000 g/mol to 1,500,000 g/mol, e.g., from 200,000 g/mol to 1,000,000 g/mol, from 250,000 g/mol to 800,000 g/mol, from 300,000 g/mol to 700,000 g/mol, from 320,000 g/mol to 500,000 g/mol, from 350,000 g/mol to 450,000 g/mol or about 390,000 g/mol. In terms of upper limits, the polyacrylate base polymer can have an average molecular weight of less than 1,500,000 g/mol, e.g., less than 1,000,000 g/mol, less than 800,000 g/mol, less than 700,000 g/mol, less than 600,000 g/mol. In terms of lower limits, the polyacrylate base polymer can have an average molecular weight of greater than 200,000 g/mol, e.g., greater than 250,000 g/mol, or greater than 300,000 g/mol.

The polyacrylate base polymer, in some embodiments, has a $T_g$ within particular ranges and/or limits. The $T_g$ defines the region where the polymer transitions from a hard, glassy material to a soft, rubbery material. In some embodiments, the polyacrylate base polymer has a $T_g$ ranging from −99° C. to −20° C., e.g., from −80° C. to −30° C., from −60° C. to −35° C., from −50° C. to −35° C., from −50° C. to −40° C., or about −42.5° C. In terms of lower limits, the $T_g$ of the polyacrylate base polymer is higher than −99° C., e.g., higher than −80° C. or higher than −60° C. In terms of upper limits, the $T_g$ of the polyacrylate base polymer is lower than −20° C., e.g., lower than −30° C., or lower than −35° C. The glass transition temperature of the polyacrylate base polymer is typically lower than that of the polyacrylate tackifier. In some embodiments, the $T_g$ of the polyacrylate base polymer is 5° C.-50C.° lower than that of the polyacrylate tackifier, e.g., 10° C.-45° C. lower, 15° C.-40° C. lower, 20° C.-35° C. lower, or 31° C. lower.

In some embodiments, the PSA comprises polyacrylate base polymer in an amount that ranges from 30 wt. % to 99.9 wt. %, e.g., 40 wt. % to 99.9 wt. %, 50 wt. % to 99.9 wt. %, 60 wt. % to 90 wt. %, from 80 wt. % to 99.9 wt. %, from 85 wt. % to 99.9 wt. %, from 90 wt. % to 99.8 wt. %, from 92 wt. % to 98 wt. %, e.g., about 94 wt. %, based on the total dry weight of the PSA. In terms of upper limits, the polyacrylate base polymer is present in an amount less than 100 wt. %, less than 99.9 wt. %. In terms of lower limits, the polyacrylate base polymer is present in an amount greater than 30 wt. %, e.g., greater than 40 wt. %, greater than 50 wt. %, greater than 60 wt. %, or greater than 70 wt. %.

Suitable commercially available polyacrylate base polymers include, but are not limited to, 3-4229, 3422, 3468, and 3462A from Taizhou Yade Adhesive company (Zhejiang, P.R. China); BPS5296 ,BPS5330W, BPS5448 from Toyo Ink (Tokyo, Japan); Etrac 77313, Etrac 7043 from Eternal (Taiwan); Ultra Redo 109A, Ultral Redo 236A from Henkel (Düsseldorf, Germany); and Y-1220 and Y-180314X from YASUSA (JiaXing, P. Cr. China). These polyacrylate base polymers are typically available in solution, for example, 3-4229 has a solid content about 41.5 wt. % and a solvent content about 58.5 wt. %.

Polyacrylate Tackifier

Unlike conventional PSAs, which typically use low molecular weight tackifiers, e.g., rosin, the PSA disclosed herein uses a specific polyacrylate to serve as tackifiers. The inventors have found that polyacrylates have higher molecular weight than rosin and that the use of the higher molecular weight tackifier surprisingly confers the PSA increased resistance to water. This is particular useful for applications such as PSA-labeled packages, e.g., blood packages, which must be immersed in warm water bath to thaw before use. In addition, polyacrylate polymers are closer in structure to the base polymer than rosin is; which advantageously allows them to minimize the negative impact of conventional tackifiers on the cohesiveness of the PSA, which is also beneficial for its function when exposed to water.

The average molecular weight of the polyacrylate tackifier may vary. In some cases, the average molecular weight may range from 10,000 g/mol to 300,000 g/mol, e.g., from 20,000 g/mol to 280,000 g/mole, from 30,000 g/mol to 250,000 g/mole, from 90,000 g/mol to 220,000 g/mol, from 100,000 g/mol to 200,000 g/mol or about 190,000 g/mol. In terms of upper limits, the polyacrylate base polymer can have an average molecular weight of less than 300,000 g/mol, e.g., less than 280,000 g/mol, less than 250,000 g/mol. In terms of lower limits, the polyacrylate base polymer can have an average molecular weight of greater than 10,000 g/mol, e.g., greater than 20,000 g/mol, greater than 30,000 g/mol, greater than 50,000 g/mol.

The polyacrylate tackifier in the PSA has a $T_g$ that is higher than the glass transition temperature of the polyacrylate base polymer. As noted above, the inventors have found that the use of the higher $T_g$ polyacrylate also contributes to the increased cohesiveness of the PSA and thus increased water resistance. The $T_g$ of the polyacrylate tackifier used in the PSA typically ranges from −30° C. to 90° C., e.g., from −30° C. to 70° C., from −20° C. to 60° C., from −20° C. to 50° C., from −25° C. to −5° C., from −20° C. to −5° C., from −15° C. to −8° C., e.g., −11° C. In terms of lower limits, the $T_g$ of the polyacrylate base polymer is higher than −30° C., e.g., higher than −25° C., or higher than −15° C. In terms of upper limits, the $T_g$ of the polyacrylate base polymer is lower than 90° C., e.g., lower than 70° C., or lower than 60° C.

The polyacrylate tackifier is present in the PSA in an amount ranging from 0.5 wt. % to 30 wt. %, e.g., from 1 wt. % to 20 wt. %, from 3 wt. % to 15 wt. %, from 4 wt. % to 10 wt. %, e.g., about 5.6 wt. %, based on the total dry weight of the PSA. In terms of upper limits, the polyacrylate base polymer is present in an amount less than 30 wt. %, less than 20 wt. %, or less than 10 wt. %, based on the total solid weight of the PSA. In terms of lower limits, the polyacrylate base polymer is present in an amount greater than 0.5 wt. %, e.g., greater than 1 wt. %, greater than 3 wt. %, or greater than 4 wt. %.

Exemplary commercially available tackifiers that are suitable for use in the PSA disclosed herein include ZHP-108, ZHP-972,ZHP-1143, 44-127 From DIC (Japan),Neocryl® B-804, from DSM NeoResins, Aroset TM PS6033, 951001, 95100 from Ashland, STS 0120 from Toyo, Ultra Redo 247A from Henkel, BM66, BM24E from Pioneer Various monomers can be used to produce the polyacrylate base polymer or polyacrylate tackifier, so long as the polymers produced have the desired glass transition temperatures as disclosed above. In some embodiments, the polyacrylate base polymer or polyacrylate tackifier may comprise acrylate monomers that also include alkyl chains. These alkyl chains may vary widely, e.g., linear, branched, cyclical, aliphatic, aromatic, saturated, or unsaturated. The number of carbon atoms in the alkyl chain(s) of the acrylate monomer may vary, ranging from 1 to 20 carbon atoms, e.g., from 2 to 15, from 2 to 13, from 4 to 10, from 4 to 8 carbons. In preferred embodiments, these alkyl chains comprise no more than 20 carbon atoms, e.g., no more than 15 carbon atoms, no more than 12 carbon atoms, no more than 8 carbon atoms, no more than 6 carbon atoms, no more than 5 carbon atoms, or no more than 4 carbon atoms. In preferred embodiments these alkyl chains comprise greater than 1 carbon atom, e.g., greater than 1, greater than 3, greater than 4, or greater than 5 carbon atoms. In some embodiments, the polyacrylate base polymer or polyacrylate tackifier may comprise a single type of acrylate monomer, while in other cases, the polyacrylate base polymer or polyacrylate tackifier may comprise a combination of different acrylate monomers. In some embodiments, the polyacrylate base polymer or polyacrylate tackifier may include acrylic acid (AA), methyl acrylate (MA), butyl acrylate (BA), 2-ethyl hexyl acrylate (2-EHA), hydroxyethylacrylate (HEA), or combinations thereof. In some embodiments, the polyacrylate base polymer or polyacrylate tackifier do not comprise iso-butyl methyl acetate (IBMA), ethyl acrylate (EA), Vinylic monomers, or combinations thereof.

Crosslinker

The PSA of the present invention comprises one or more particular crosslinkers. These one or more crosslinkers functionally link one polymer chain to another. In some embodiments, the one or more crosslinkers are metal chelating agents. Unlike conventional crosslinkers, such as aziridine and epoxy, metal chelating agents can unexpectedly promote the ability of the PSA to affix to the substrate under ultra-low temperatures as well as increasing the water resistance of the PSA.

In some embodiments, the metal chelating crosslinker is a metal acetylacetonate, a metal alkoxide, or an alkoxy-metal acetylacetonate. A metal acetylacetonate for the purposes of this invention is a metal chelating with the enolate anion of acetylacetone as ligand. The IUPAC name for acetylacetone is pentane-2,4-dione. A metal alkoxide for the purposes of the invention is a metal alcoholate, in other words a compound composed of a metal cation and an alcoholate anion. Examples of alcoholates frequently used industrially are methanolate, ethanolate, isopropanolate, tert-butanolate. An alkoxy-metal acetylacetonate means a complex compound composed of a metal cation and at least two different ligands, one of the ligands being an alcoholate anion and another ligand being the enolate anion of acetylacetone. Synonyms for an alkoxy-metal acetylacetonate are metal alkoxide acetylacetonate or metal acetylacetone alkoxide. All of the stated metal compounds may carry additional, further ligands, without departing the concept of the invention. Preferred metals are titanium, aluminum, zirconium, zinc, and iron. In some embodiments, the metal chelating crosslinker is a triple aluminum chelating agent. In some embodiments, the metal chelating reagent comprises the following structure:

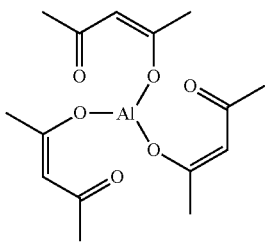

Suitable commercially available metal chelating crosslinkers include, but are not limited to ETERAC EC-87 available from Eternal Chemical (China) Ltd., LD-805 available from Yangzhou Lida (Yangzhou, China) company, A-0241 available from TCI (Shanghai) company.

The PSA may comprise from 0.1-5 wt. % of the metal chelating crosslinker, e.g., from 0.1 to 5 wt. %, from 0.2 wt. % to 4 wt. %, from 0.3 wt. % to 3 wt. %, from 0.5 wt. % to 2 wt. %, from 0.6 wt. % to 1.5 wt. %, from 0.8 wt. % to 1.2 wt. %, or about 1 wt. %, based on the total dry weight of the PSA. In terms of upper limits, the PSA comprises epoxy in an amount of less than 5 wt. %, less than 4 wt. %, less than 3 wt. %, less than 2 wt. %, and less than 1.5 wt. %, based on the total dry weight of the PSA. In terms of lower limits, the PSA comprises epoxy in an amount of greater than 0.1 wt. %, greater than 0.2 wt. %, greater than 0.3 wt. %, greater than 0.5 wt. %, greater than 0.6 wt. %, greater than 0.8 wt. % based on the total dry weight of the PSA.

In some embodiments, the PSA comprises less than 2 wt. %, e.g., less than 1 wt. %, less than 0.5 wt. %, less than. 0.3 wt. %, or less than 0.1 wt. % rosin resin, aziridine, or epoxy or combinations thereof. As noted above, the reduction of rosin resin in the PSA reduces/eliminattes problems associated hardening of the PSA, which impair the ability of attaching to the substrate under ultra-low temperature and the poor resistance to warm water bath.

As noted above, the combination of the unique polyacrylate base polymer, polyacrylate tackifier, and/or metal chelating crosslinkers, as described above, provides for the surprising results that the PSA is able to remain attached to substrate under ultra-low temperatures (−40° C. or lower) and/or when the PSA is in contact with water, e.g., submerged in a water bath of a temperature range of 30° C. to 40° C., e.g., 37° C.

In some specific cases, the glass transition temperature of the polyacrylate base polymer may range from −50° C. to −40° C., and the molecular weight of the polyacrylate base polymer may range from 350,000 g/mol to 450,000 g/mol. The polyacrylate base polymer may be present in an amount ranging from 92 wt. % to 98 wt. %.%, based on the total solid weight of the pressure sensitive adhesive.

In another embodiment, the glass transition temperature of the polyacrylate tackifier ranges from −30° C. to 50° C. and the molecular weight of the polyacrylate tackifier ranges from 10,000 g/mol to 300,000 g/mol (e.g., 100,000 g/mol to 300,000 g/mol); and the polyacrylate tackifier may be present in an amount ranging from 4 wt. % to 10 wt. % based on the solid weight of the pressure sensitive adhesive; the metal chelating crosslinker may be present in an amount ranging from 0.8 wt. % to 1.2 wt. %.

The PSA having the aforementioned ingredients shows optimal tack and shear. In some embodiments, the PSA demonstrates a peel strength of at least 11.7 N/inch to 30 N/inch on polyvinyl chloride, measured after the PSA has been attached to the polyvinyl chloride plate for 20 minute according to FINAT-1 (2018), and a static shear on stainless steel of 5,000 minutes to 15,000 minutes, as measured by FINAT-8 (2018) under ambient temperatures.

The PSA is capable of remaining attached to a substrate when the pressure sensitive adhesive has been in exposed to water for a period of 0.5 hour to 1 day, e.g, 0.5 hour to 10 hours, 0.5 hour to 6 hours.

In some embodiments, the PSA has a number of features, which, in combination, contribute to the excellent ultra-low temperature performance and water resistance: the glass transition temperature of the polyacrylate base polymer ranges from −99° C. to −20° C.; the molecular weight of the polyacrylate base polymer ranges from 200,000 g/mol to 1,500,000 g/mol (e.g., from to 200,000 g/mol to 1,000,000 g/mol); the polyacrylate base polymer is present in an amount ranging from 70 wt. % to 99.9 wt. %, based on the total solid weight of the pressure sensitive adhesive; the glass transition temperature of the polyacrylate tackifier ranges from −35° C. to −50° C.; the molecular weight of the polyacrylate tackifier ranges from 10,000 g/mol to 300,000 g/mol; the polyacrylate tackifier is present in an amount ranging from 1 wt. % to 10 wt. % based on the solid weight of the pressure sensitive adhesive; and the metal chelating crosslinker is present in an amount of 0.1 wt. % to 5 wt. %.

In some embodiments, the glass transition temperature of the polyacrylate base polymer ranges from −50° C. to −40° C.; the molecular weight of the polyacrylate base polymer ranges from 350,000 g/mol to 450,000 g/mol; the polyacrylate base polymer is present in an amount ranging from 92 wt. % to 98 wt. %.%, based on the total solid weight of the pressure sensitive adhesive; the glass transition temperature of the polyacrylate tackifier ranges from −15° C. to −8° C. and the molecular weight of the polyacrylate tackifier ranges from 100,000 g/mol to 200,000 g/mol; the polyacrylate tackifier is present in an amount ranging from 4 wt. % to 10 wt. % based on the solid weight of the pressure sensitive adhesive; the metal chelating crosslinker is present in an amount ranging from 0.8 wt. % to 1.2 wt. %; and the pressure sensitive adhesive demonstrates a peel strength of at least 11.7 N/inch to 30 N/inch on polyvinyl chloride, as measured by FINAT-1 (2018) and a static shear on stainless steel greater than 5000 minutes (e.g., greater than 8,000 minutes), as measured by FINAT-8 (2018).

In some embodiments, the glass transition temperature of the polyacrylate base polymer ranges from −50° C. to −40° C.; the molecular weight of the polyacrylate base polymer ranges from 350,000 g/mol to 450,000 g/mol; the polyacrylate base polymer is present in an amount ranging from 92 wt. % to 98 wt. %, based on the total solid weight of the pressure sensitive adhesive; the glass transition temperature of the polyacrylate tackifier ranges from −15° C. to −8° C.; the molecular weight of the polyacrylate tackifier ranges from 10,000 g/mol to 300,000 g/mol (e.g., 100,000 g/mol to 200,000 g/mol); the polyacrylate tackifier is present in an amount ranging from 4 wt. % to 10 wt. % based on the solid weight of the pressure sensitive adhesive; the metal chelating crosslinker is present in an amount ranging from 0.8 wt. % to 1.2 wt. %; and the pressure sensitive adhesive demonstrates a peel strength of at least 11.7 N/inch to 30 N/inch on polyvinyl chloride, as measured by FINAT-1 (2018), and a static shear on stainless steel greater than 5,000 minutes, as measured by FINAT-8 (2018); the pressure sensitive adhesive is capable of remaining attached to a substrate when the pressure sensitive adhesive has been subjected to a temperature ranging from −40° C. to 37° C. for a period of 0.5 hour to 10 years; and the pressure sensitive adhesive is capable of remaining attached to a substrate when the pressure sensitive adhesive has been in contact with water for a period of 0.5 hour to 1 week.

Laminate Composition

The disclosure also provides a laminate composition that comprises any of the PSAs disclosed above. The laminate composition may comprise a facestock layer and an adhesive layer comprising the PSA as disclosed herein. In some cases, the laminate composition further comprises a topcoat layer disposed on the top of the facestock layer. In some cases, the laminate composition further comprises one or more primer layers and/or a liner, as further described below. The disclosure also contemplates labels that comprise the laminate compositions.

Facestock Layer

The laminate composition may have one or more facestock layers. In one embodiment, from the perspective of looking downward to the substrate, the facestock layer is on the top surface of the label, exposed to the environment and is configured to receive printable information, such as barcode or alphanumeric characters.

In some embodiments, the pressure sensitive adhesive is disposed in the form of a flat layer (optionally as a layer in the laminate composition). The flat layer has a thickness in the range of 8-80 microns, e.g., from 12 to 50 microns, from 10 to 60 microns, from 20-70 microns, from 30-60 microns, or from 20 to 50 microns, or other ranges in the foregoing amounts. In terms of lower limits, the PSA layer may have a thickness of at least 8 micron, e.g., at least 10 microns, at least 20 microns, or at least 30 micros. In terms of upper limits, the polyolefin films may have a thickness less than 80 microns, e.g., less than 70 microns, less than 60 microns, or less than 50 microns.

The facestock layer can include, for example, glassine, kraft, and polyesters, such as polyethylene terephthalate (PET), polyamides (PA), polyethylene naphthalate (PEN), cotton, tissue, paper, fiberglass, synthetic textiles, and polyolefins, such as polypropylene (PP), Polyvinyl chloride (PVC), ethylene-propylene copolymers, polyethylene (PE), and combinations thereof. Other polymeric film materials include urethane based polymers such as polyether urethane and polyester urethane; amide based polymers including polyether polyamide copolymers; acrylic based polymers including a polyacrylate, and ethylene/vinyl acetate copolymer; polyester based polymers including a polyether polyester; a vinyl chloride; a vinylidene chloride; a polystyrene; a polyacrylonitrile; a polycarbonate; a polyimide; ABS; polyacrylate; polycarbonate (PC); polyamide; polyimide (PI); polyamidoimide; polyacetal; polyphenylene oxide (PPO); polysulfone, polyethersulfone (PES); polyphenylene sulfide; polyether ether ketone (PEEK); polyetherimide (PE1); metallized polyethylene terephthalate (PET); polyvinyl fluoride (PVF); polyethylene ether (PEE); fluorinated ethylene propylene (FEP); polyurethane (PUR); liquid crystal polymers (LCPs, class of aromatic polyester); polyvinylidene fluoride (PVDF); aramid fibers; DIALAMY, (polymer alloys); polyethylene naphthalate (PEN); ethylene/tetrafluoroethylene; (E/TFE); polyphenyl sulfone (PPSU); and polymers or polymer alloys containing one or more of these materials.

The thickness or coating weight of the facestock layer may vary depending on the stiffness of the label desired for particular applications. The facestock layer according to certain embodiments of the present invention may comprise a thickness ranging from 100 microns to 1,000 microns, e.g., from 200 microns to 800 microns, from 150 microns to 500 microns, from 300 microns −600 microns, or from 450 microns to 900 microns, or other ranges in the foregoing amounts. In terms of lower limits, the facestock layer may have a thickness of at least 100 microns, e.g., at least 150 microns, at least 200 microns, or at least 300 microns. In terms of upper limits, the polyolefin films may have a thickness less than 1000 microns, e.g., less than 800 microns, less than 500 microns, less than 400 microns, or less than 300 microns. In some embodiments, the facestock layer is 125 microns.

In some embodiments, the laminate composition comprises a topcoat layer disposed on the top of the facestock layer. The topcoat may enhance printing performance, durability and/or chemical resistance. In one embodiment, the topcoat layer of the label typically comprises a resin. Non-limiting examples of the resins that are suitable for use as topcoat include polyester-amino resin and a phenoxy resin, polyester-isocyanate, polyurethane, and polyacrylate. In some embodiments, the topcoat may possess one or more additional properties such as UV-resistance and anti-scratch property.

In some embodiments, the topcoat layer may also be configured to be receptive to printing. For example, the topcoat layer may comprise one or more printable layers containing an ink-receptive composition that is utilized to form the printable information. A variety of such compositions are known in the art, and these compositions generally include a binder and a pigment, such as silica or talc, dispersed in the binder. Optionally, the printable layer comprises a crosslinker CX-100 (DSM's polyfunctional aziridine liquid crosslinker). A number of such ink-receptive compositions are described in U.S. Pat. No. 6,153,288, the disclosure of which is hereby incorporated by reference. Printable information can be deposited on the facestock layer using various printing techniques, such as screen printing, dot-matrix, ink jet, laser printing, laser marking, thermal transfer, and so on. In some cases, the facestock layer is receptive to thermal transfer printing.

The inks used for printing on the topcoat layer may vary widely and may include commercially available water-based, solvent-based or radiation-curable inks Examples of these inks include Sun Sheen (a product of Sun Chemical identified as an alcohol dilutable polyamide ink), SUN-TEX® MP (a product of Sun Chemical identified as a solvent-based ink formulated for surface printing acrylic coated substrates, PVDC coated substrates and polyolefin films), X-Cel (a product of Water Ink Technologies identified as a water-based film ink for printing film substrates), Uvilith AR-109 Rubine Red (a product of Daw Ink identified as a UV ink) and CLA91598F (a product of Sun Chemical identified as a multibond black solvent-based ink).

In some cases, the printable layer may be a layer that utilizes activatable inks, e.g., stimulus-activatable inks, such as (for example) laser-activated, pressure-activated, or temperature-activated inks.

The topcoat layer, in accordance with certain embodiments of the present invention, may be applied onto the facestock portion of the facestock layer by any known techniques in the art, such as spray, roll, brush, or other techniques. The printable layer can be formed by depositing, by gravure printing or the like, on the topcoat layer, with the bottom surface in contact with the top surface of the topcoat layer.

Other (Optional) Components

In some cases, the PSAs, facestock layer, topcoat layer, or primer layer may optionally include one or more fillers, antioxidants, UV-absorbers, photo-stabilizers, and/or fillers. These additives may be incorporated into the adhesive in conventional quantities using conventional equipment and techniques. For example, representative fillers can include talc, calcium carbonate, organo-clay, glass fibers, marble dust, cement dust, feldspar, silica or glass, fumed silica, silicates, alumina, various phosphorus compounds, ammonium bromide, titanium dioxide, antimony trioxide, antimony trioxide, zinc oxide, zinc borate, barium sulfate, silicones, aluminum silicate, calcium silicate, glass microspheres, chalk, mica, clays, wollastonite, ammonium octamolybdate, intumescent compounds and mixtures of two or more of these materials. The fillers may also carry or contain various surface coatings or treatments, such as silanes, fatty acids, and the like. Still other fillers can include flame-retardant agents, such as the halogenated organic compounds. In certain embodiments, the topcoat layer may include one or more thermoplastic elastomers that are compatible with the other constituents of the layer, such as etherified melamine, hydroxylated polyester, polyester-melamine, and other suitable elastomers.

Optionally, the label disclosed herein comprises one or more primer layers and the one or more primer layers may be situated between the facestock layer and the adhesive layer.

Liner

In some embodiments, the label further includes a liner deposited on the opposite side of the surface of the reactive adhesive layer that contacts the facestock layer. A releasable liner can be positioned adjacent to the reactive adhesive layer such that the reactive adhesive layer is disposed, or sandwiched, directly or indirectly between the bottom surface of facestock layer and the releasable liner. The releasable liner may function as a protective cover such that the release liner remains in place until the label is ready for attachment to an object. If a liner or release liner is included in the label, a wide array of materials and configurations can be used for the liner. In many embodiments, the liner is a paper or paper-based material. In many other embodiments, the liner is a polymeric film of one or more polymeric materials. Typically, at least one face of the liner is coated with a release material such as a silicone or silicone-based material. As will be appreciated, the release material-coated face of the liner is placed in contact with the otherwise exposed face of the adhesive layer. Prior to application of the label to a surface of interest, the liner is removed to thereby expose the adhesive face of the label. The liner can be in the form of a single sheet. Alternatively, the liner can be in the form of multiple sections or panels.

The liner used in the label may have a thickness ranging from 20 microns to 150 microns, e.g., from 30 microns to 120 microns, from 60 microns to 100 microns, or from 50 microns to 90 microns. In terms of upper limits, the thickness of the label is less than 150 micron, e.g., less than 130 microns, or less than 100 microns. In terms of lower limits, the thickness of the label is greater than 20 microns, e.g., greater than 30 microns, or greater than 40 microns.

Various additives can also be added to one or more of the facestock layer, the primer layer, the adhesive layer, or liner layers to obtain a certain desired characteristic. These additives can include, for example, one or more waxes, surfactants, talc, powdered silicates, filler agents, defoamers, colorants, antioxidants, UV stabilizers, luminescents, crosslinkers, buffer agents, anti-blocking agents, wetting agents, matting agents, antistatic agents, acid scavengers, flame retardants, processing aids, extrusion aids, and others.

Performance

The PSA of the disclosure demonstrates good mechanical performance, for example, a high peel strength, indicating that it has excellent tack. Peel strength is the average force required to remove an adhesive laminated under specified conditions on a substrate, from the substrate at constant speed and at a specified angle. Peel strength can be assessed using methods well known in the art. In some embodiments, peel strength evaluations are performed according to the FINAT Test Method 1 (2018) ("FINAT-1"). The specimen comprising the PSA to be tested are prepared by cutting into strips of dimensions suitable for testing. For example, the strips may has a width of 50 mm and a length of 175 mm. The backing material, if present, is removed before adhering the strips to a clean test plate using a roller. Typically at least three strips from each sample are tested 20 minutes after the PSA has been attached to the plate or 48 hours after the PSA has been attached. In some embodiments, the test plate is positioned relative to the measuring device in a way such that the angle of peel is 180° C. The test plate can be of any material suitable for evaluating peel strength of the PSA. In some embodiments, the test plate comprises polyvinyl chloride. The peeling force is recorded when the strips are peeled off the test plate at a predetermined speed, e.g., 300 mm per minute. Typically, a minimum of five readings at 10 mm intervals from the center section of each of the strips are recorded.

In some cases, when the PSA has been attached to the polyvinyl chloride test plate for 20 minutes, the PSA may demonstrate a peel strength from 11.7 N/inch to 40 N/inch on according to the FINAT-1 (2018), e.g., from 12 N/inch to 35 N/inch, from 13 N/inch to 30 N/inch, from 13.5 N/inch to 20 N/inch, e.g., about 11.5 N/inch. In terms of upper limits, the PSA demonstrated a peel strength of less than 40 N/inch, less than 35 N/inch, less than 30 N/inch, or less than 20 N/inch on stainless steel substrate. In terms of lower limits, the PSA demonstrated peel strength of greater than 11.7 N/inch, greater than 12 N/inch, greater than 13 N/inch, or greater than 13.5 N/inch.

The PSA of this disclosure also shows high static shear, indicating excellent cohesiveness. Static shear can be tested using methods well known in the art. The test specimen comprising the PSA is centered on test panel, and is applied without added pressure to cover an area on the test panel, e.g., an area of 12.5 mm×12.5 mm. The test panel can be produced from any material suitable for the static shear testing. In one embodiment, the test panel is a stainless steel panel. Typically, the test specimen is adhered to the steel panel at ambient temperature for one day before a load of 0.5 kg is applied to the specimen. The weight of the load will gradually pull the specimen off the test panel. The duration of specimen while it remains on the test panel can be recorded. The longer the time the specimen remains on the panel, the greater the static shear the specimen possesses.

In some cases, the PSA demonstrates a static shear that ranges from 5,000 minutes to 15,000 minutes, e.g., from 6,000 minutes to 12,000 minutes, from 7,000 minutes to 10,000 minutes, or from 7,500 minutes to 8,500 minutes, or about 8,000 minutes, when tested on stainless steel under the ambient temperature. In terms of lower limits, the static shear is greater than 5,000 minutes, greater than 6,000 minutes, greater than 7,000 minutes, or greater than 8,000 minutes. In terms of upper limits, the static shear is lower than 15,000 minutes, lower than 12,000 minutes, or lower than 10,000 minutes. In some cases, using a polyacrylate tackifier as opposed to using a non-polyacrylate tackifer can increase cohesiveness as reflected in that static shear measured using FINAT-8 (2018) of the PSA having polyacrylate tackifier is at least 2×, at least 5×, at least 10×, at least 100× higher than that of the PSA having non-polyacrylate tackifier.

As noted above, without being limited to a particular theory, it is believed that using polyacrylate polymers as tackifiers in the PSA can significantly increase both the tack and cohesiveness of the PSA. In some cases the molecular weight of polyacrylate tackifiers is much higher than that of the traditional tackifiers. The polyacrylate tackifier itself can also be used as adhesive, thus using the acrylate as tackifier can minimize the negative impact on the cohesiveness of the PSA and increase the PSA's static shear and resistance to water. In some embodiments, as shown in Example 1, using a polyacrylate tackifier as opposed to using a non-polyacrylate tackifer, such as rosin, can increase tack by 10% to 60%, when other components of the PSA are the same. In some embodiments, the increase of tack is between 15% to 50%, e.g., between 20% to 40%, or about 27%. In terms of upper limits, the increase is less than 60%, e.g., less than 50%, or less than 40%. In terms of lower limits, the increase is greater than 10%, greater than 15%, or greater than 20%.

In some embodiments, the pressure sensitive adhesive of the invention, having the unique combination of a polyacrylate base polymer, a polyacrylate tackifier, and/or a metal chelating crosslinker above, is capable of remaining attached to a substrate when the PSA has been in contact in water for a period of 0.5 hour to 1 week, e.g., 0.5 hour to 24 hours, 1 hour to 10 hours, e.g. about 6 hours. In some embodiments, the water is at a temperature of 30° C. to 40° C., for example, about 37° C. In some embodiments, the PSA is able to remain attached to the substrate under a temperature of −40° C. or lower. In some embodiments, the PSA is capable of remaining attached to a substrate when the PSA has been subjected to a temperature ranging from −99° C. to −20° C., e.g., from −90° C. to −20° C., or from −80° C. to −40° C.

Adhesive Solution

This disclosure also provides an adhesive solution which comprises a solvent, a polyacrylate base polymer (typically in solution form, e.g., a polyacryate base polymer 3-4229 may comprise 41.5 wt. % of solid content), a polyacrylate tackifier (also typically in solution form, e.g., a polyacrylate tackifier 247A may comprise 48 wt. % of solid content), a metal chelating crosslinker as disclosed above. The glass transition temperature of the polyacrylate base polymer is lower than the glass transition temperature of the polyacrylate tackifier. Both the glass transition temperature of the polyacrylate tackifier and the glass transition temperature of the polyacrylate base polymer are lower than 90° C.

The solvent that can be used to produce the PSA disclosed herein may be one or more solvents selected from the group consisting of toluene, ethyl acetate, isopropanol, xylene, n-hexane, n-heptane, methyl cyclohexane, butyl acetate, acetone, butanone, and 2-Acetoxy-1-methoxypropane.

In some embodiments, the polyacrylate base polymer solution comprises from 25 wt. % to 60 wt. %, e.g., 30 wt. % to 60 wt. %, from 35 wt. % to 50 wt. %, from 40 wt. % to 50 wt. %, from 40 wt. % to 55 wt. %, or about 41.5 wt. % of solid content of polyacrylate base polymer. In terms of upper limits, the polyacrylate base polymer solution comprises less than 60 wt. %, less than 55 wt. %, less than 50 wt. %, or less than 45 wt. % of the solid content of polyacrylate base polymer. In terms of lower limits, the polyacrylate base polymer solution comprises greater than 30 wt. %, e.g., greater than 35 wt. %, or greater than 40 wt. % of solid content of polyacrylate base polymer. In some embodiments the polyacrylate base polymer solution is present in the PSA solution in an amount ranging from 60 wt. % to 90 wt. %, e.g., from 65 wt. % to 85 wt. %, from 70 wt. % to 90 wt. %, from 75 wt. % to 85 wt. %, e.g., about 80 wt. %, based on the total weight of the pressure sensitive adhesive solution. In terms of upper limits, the PSA solution comprises polyacrylate base polymer solution in an amount of less than 90 wt. %, less than 85 wt. %, based on the total weight of the PSA solution. In terms of lower limits, the PSA solution comprises polyacrylate base polymer solution in an amount of greater than 70 wt. %, e.g., greater than 75 wt. %, based on the total weight of the PSA solution. In some embodiments, the polyacrylate base polymer solution is 3-4229, which comprises 41.5 wt. % solid content of 3-4229 (TaiZhou Yade Adhesive company, Taizhou, P.R. China).

In some embodiments, the polyacrylate tackifier solution comprises from 30 wt. % to 60 wt. %, e.g., from 40 wt. % to 55 wt. %, or about 48 wt. % of solid content. The polyacrylate tackifier solution may be present in an amount ranging from 1 wt. % to 10 wt. %, e.g., from 1 wt. % to 9 wt. %, from 3 wt. % to 8 wt. %, e.g., about 3.7 wt. %, based on the total weight of the pressure sensitive adhesive solution. In terms of upper limits, the PSA solution comprises polyacrylate tackifier solution in an amount of less than 10 wt. %, less than 9 wt. %, less than 8 wt. %, based on the total weight of the PSA solution. In terms of lower limits, the PSA solution comprises polyacrylate tackifier solution in an amount of greater than 1 wt. %, e.g., greater than 2 wt. %, based on the total weight of the PSA solution. In some embodiments, the polyacrylate tackifier solution is 247A from Henkel (Dusseldorf, Germany), which comprises 48 wt. % solid content.

The amount of solvent(s) used for producing the adhesive solution may vary depending on the desired viscosity that is suitable for coating on the substrate or other layers. Typically, the solvent is present in the adhesive solution in an amount ranging from 10 wt. % to 70 wt. %, e.g., 10 wt. % to 40 wt. %, from 8 wt. % to 30 wt. %, from 10 wt. % to 25 wt. %, from 12 wt. % to 20 wt. %, e.g., about 15.6 wt. %. In terms of lower limits, the solvent is present in an amount of greater than 5 wt. %, e.g., greater than 8 wt. %, greater than 10 wt. %, or greater than 12 wt. %, or greater than 15 wt. %, based on the total weight of the adhesive solution. In terms of upper limits, the solvent is present in an amount of less than 70 wt. %, less than 60 wt. %, less than 40 wt. %, less than 30 wt. %, or less than 25 wt. %, based on the total weight of the adhesive solution.

Production of the PSA

The present invention also relates to methods of producing a PSA. The methods include dissolving in a solvent, a polyacrylate base polymer, a polyacrylate tackifier, a metal chelating crosslinker to form an adhesive solution. Any of the aforementioned embodiments of the polyacrylate base polymer, a polyacrylate tackifier, the metal chelating crosslinker can be used to produce an adhesive solution. An exemplary PSA solution is prepared using components shown in Table 1. This process is commonly referred to as compounding. The compounding can occur under a temperature less than 50° C., e.g., between 20° C. and 40° C., or between 20° C. and 30° C.

A variety of solvents can be used to dissolve the components of the PSA. Suitable solvents include those that demonstrate proper evaporation rate and in which the various components show good solubility. In preferred embodiments, the solvent is a petroleum-based solvent. Suitable solvents include but are not limited to, aromatic solvents, aliphatic solvents, ester solvents, xylene, ethyl benzene, isopropyl alcohol, and combinations thereof. Examples of aromatic solvents include aromatic rings with alkyl substitution (e.g. toluene). Examples of ester solvents include esters of 3 or more carbon atoms (e.g. methyl acetate, or ethyl acetate). In some embodiments, two or more solvents can be used to dissolve various components above to produce the adhesive solution.

The adhesive solution, as prepared above, has good coatability with a typical viscosity from 100 to 5,000 cps, e.g., from 200 to 4,000 cps, from 300 to 3,000 cps, from 400 to 2,000 cps, from 300 to 600 cps, or about 500 cps. In terms of lower limits, the viscosity is greater than 100, e.g., greater than 200 cps, greater than 300 cps, or greater than 400 cps. In terms of upper limits, the viscosity is less than 5,000, less than 4,000 cps, less than 2,000 cps, less than 1,000 cps. Methods for measuring viscosity are well known, for example using the Brookfield Viscometer method, testing the flow resistance of the fluid by low and medium rate rotation.

The adhesive solution can be coated to a facestock using methods that are well known for solvent based adhesives, for example, as disclosed in *Manufacturing Pressure-Sensitive Adhesive Products: A Coating and Laminating Process*, available at adhesivesmag.com/articles/86079-manufacturing-pressure-sensitive-adhesive-products-a-coating-and-laminating-process, the content of which is hereby incorporated by reference in its entirety.

In some embodiments, the coating is performed by direct coating, in which the pressure-sensitive adhesive is coated directly onto the facestock or backing material and dried to produce a label. In some embodiments, the coating is performed by transfer coating, in which the adhesive is first coated onto a release liner (as described above), and dried. The dried adhesive/liner is then laminated with a facestock.

In some embodiments, the adhesive solution as produced above can then be coated onto a facestock or a release liner using a solvent coater by knife over roll, slot die, or comma coating. The solution may be coated to form an adhesive layer having a coat weight of at least 5 grams per square meter (gsm), e.g., at least 10 gsm or at least 15 gsm. In terms of upper limits, the solution may be coated to form an adhesive layer having a coat weight of 60 gsm or less, e.g., 50 gsm or less, or 40 gsm or less. In terms of ranges, the solution may be coated to form an adhesive layer having a coat weight from 5 gsm to 60 gsm, e.g., from 10 gsm to 50 gsm or from 15 gsm to 40 gsm, depending on the end use of the adhesive layer. The facestock/liner coated with the solution above then can be dried as further described below and processed into labels. In some cases, it is used as a transfer adhesive without being associated with a facestock.

The coating process is typically performed in an oven having multiple temperature zones, e.g., at least 2 zones, at least 3 zones, at least four zones, at least five zones, or at least six zones. The temperature zones may range from 30° C. to 200° C., e.g., from 40° C. to 150° C. or from 60° C. to 130° C. The temperature may increase from the first to last zone, though multiple zones may be at the same temperature.

Once coated, the adhesive may be dried in an oven, for a predetermined drying time. The drying oven can have a temperature of greater than 100° C. The rate of solvent evaporation increases with temperature. The drying time can be at least 2 minutes, at least 4 minutes, at least 6 minutes, at least 8 minutes, at least 10 minutes, at least 15 minutes, at least 20 minutes, at least 25 minutes, at least 30 minutes, at least 40 minutes, at least 50 minutes, or at least 1 hour.

Labeling Articles

The present invention also relates to methods of applying a label comprising the PSA to an article (also referred to as a substrate). The present invention also provides labeled articles. The methods include providing an article defining an outer surface, and a label in accordance with an embodiment. The methods further include affixing the label to the outer surface of the article, thereby applying the label to the article.

The labels can be affixed to the articles in a batch, continuous, or semi-continuous fashion. Prior to application, one or more liners can be removed from the labels to thereby expose the adhesive face of the labels. The adhesive face and label is then contacted with the container(s) or article(s) and the labels applied thereto. Adhering may also include one or more operations of pressing or otherwise applying a pressing force against the label to promote contact and/or adhesion with the container; activating and/or curing of the adhesive such as by heating and/or exposure to UV light; and/or drying operations.

In some embodiments, the article to be labeled is an article that has a temperature of −40° C. or lower. In some embodiments, the article is one that, after being labeled with the PSA in this invention, is to be placed in warm water bath having a temperature of 30° C. to 40° C., for example, about 37° C. In some embodiments, the article is a blood package. In some embodiments, the label is affixed to e.g., the surface of the blood package. In some embodiments, the label is attached to the tubings attached to the blood product package.

Adhesive System

Typically, when in storage, the solution containing the polyacrylate base polymer, optionally also the polyacrylate tackifier, is kept separate from the metal chelating crosslinkers to prevent undesired crosslinking. The crosslinkers can be added to the solution containing the polyacrylate base polymer immediately prior to the producing of the adhesive and/or the labels. Thus, also provided is an adhesive system comprising: a) a polycrylate base polymer; b) a metal crosslinker; the crosslinker is separate from the polyacrylate base polymer.

The materials in the adhesive system may be present in the amounts such that the PSAs produced have the properties described in this disclosure.

Embodiments

This invention is further illustrated by the following exemplary embodiments.

Embodiment 1: A pressure sensitive adhesive comprising: a polyacrylate base polymer having a glass transition temperature, a polyacrylate tackifier having a glass transition temperature, and a metal chelating crosslinker, wherein both the glass transition temperature of the polyacrylate tackifier and the glass transition temperature of the polyacrylate base polymer are lower than 90° C., and wherein the glass transition temperature of the polyacrylate base polymer is lower than the glass transition temperature of the polyacrylate tackifier.

Embodiment 2: The pressure sensitive adhesive of embodiment 1, wherein the adhesive is a solvent-borne PSA.

Embodiment 3: The pressure sensitive adhesive of embodiment 1, wherein the glass transition temperature of the polyacrylate base polymer ranges from −99° C. to −20° C.

Embodiment 4: The pressure sensitive adhesive of any of embodiments 1-2, wherein the glass transition temperature of the polyacrylate tackifier is greater than −30° C.

Embodiment 5: The pressure sensitive adhesive of any of embodiments 1-2, wherein the glass transition temperature of the polyacrylate tackifier ranges from −30° C. to 90° C.

Embodiment 6: The pressure sensitive adhesive of any of embodiments 1-5, wherein the glass transition temperature of the polyacrylate base polymer ranges from −50° C. to −35° C.

Embodiment 7: The pressure sensitive adhesive of any of embodiments 1-6, the $T_g$ of the polyacrylate base polymer is 5° C. to 100° C. lower than that of the polyacrylate tackifier.

Embodiment 8: The pressure sensitive adhesive of any of embodiments 1-7, wherein the molecular weight of the polyacrylate base polymer is greater than the molecular weight of the polyacrylate tackifier.

Embodiment 9: The pressure sensitive adhesive of any of embodiments 1-8, wherein the polyacrylate base polymer has a molecular weight ranging from 200000 g/mol to 1,500,000g/mol.

Embodiment 10: The pressure sensitive adhesive of any of embodiments 1-9, wherein the polyacrylate base polymer is present in an amount ranging from 30 wt. % to 99.9 wt. %, based on the total solid weight of the pressure sensitive adhesive.

Embodiment 11: The pressure sensitive adhesive of any of embodiments 1-10, wherein the polyacrylate base polymer is one or more polymers selected from the group consisting of 3-4229, 3422, 3468, and 3462A from Taizhou Yade Adhesive company; BPS 5296, BPS5330W, and BPS5448 from Toyo Ink; Etrac 77313 and Etrac 7043 from Eternal; Ultra Redo 109A and Ultral Redo 236A from Henkel; and Y-1220 and Y-180314X from YASUSA.

Embodiment 12: The pressure sensitive adhesive of any of embodiments 1-11, wherein the polyacrylate tackifier has a molecular weight ranging from 10,000 g/mol to 300,000 g/mol.

Embodiment 13: The pressure sensitive adhesive of any of embodiments 1-12, wherein the polyacrylate tackifier is present in an amount ranging from 0.5 wt. % to 30 wt. %, based on the total solid weight of the pressure sensitive adhesive.

Embodiment 14: The pressure sensitive adhesive of any of embodiments 1-13, wherein the polyacrylate base polymer comprises less than 2 wt. % rosin resin, aziridine, or epoxy or combinations thereof.

Embodiment 15: The pressure sensitive adhesive of any of embodiments 1-14, wherein the pressure sensitive adhesive demonstrates a peel strength greater than 11.6 N/inch on polyvinyl chloride, as measured by FINAT Test Method 1 (2018).

Embodiment 16: The pressure sensitive adhesive of any of embodiments 1-15, wherein the pressure sensitive adhesive demonstrates a shear greater than 8,000 minutes on stainless steel according to FINAT 2018.

Embodiment 17: The pressure sensitive adhesive of any of embodiments 1-16, wherein the pressure sensitive adhesive has a peel strength on polyvinyl chloride ranging from 5 N/inch to 20 N/inch.

Embodiment 18: The pressure sensitive adhesive of any of embodiments 1-17, wherein the pressure sensitive adhesive is capable of remaining attached to a substrate when the pressure sensitive adhesive has been subjected to a temperature ranging from −99° C. to −20° C. for a period of 1 month to 10 years.

Embodiment 19: The pressure sensitive adhesive of any of embodiments 1-17, wherein the pressure sensitive adhesive is capable of remaining attached to a substrate when the pressure sensitive adhesive has been subjected to a temperature ranging from 20° C. to 40° C. for a period of 1 month to 10 years.

Embodiment 20: The pressure sensitive adhesive of any of embodiments 1-18, wherein the pressure sensitive adhesive is capable of remaining attached to a substrate when the pressure sensitive adhesive has been in contact with water for a period of 0.5 hour to 1 month. Optionally, the water is at a temperature of 37° C.

Embodiment 21: The pressure sensitive adhesive of any of embodiments 1-20, wherein the metal chelating agent is a triple aluminum having the structure of the formula below:

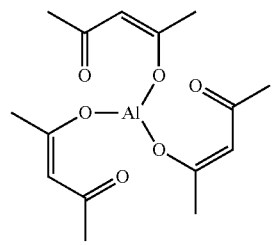

Embodiment 22: The pressure sensitive adhesive of any of embodiments 1-21, wherein the metal chelating agent is present in an amount ranging from 0.1 wt. % to 5 wt. %, based on the total solid weight of the pressure sensitive adhesive.

Embodiment 23: The pressure sensitive adhesive of any of embodiments 1-22, wherein the glass transition temperature of the polyacrylate base polymer ranges from −50° C. to −40° C. and the molecular weight of the polyacrylate base polymer ranges from 350,000 g/mol to 450,000 g/mol, and wherein the glass transition temperature of the polyacrylate tackifier ranges from −30° C. to 50° C.) and the molecular weight of the polyacrylate tackifier ranges from 10,000 g/mol to 300,000g/mol (e.g., 100,000 g/mol to 200,000 g/mol).

Embodiment 24: The pressure sensitive adhesive of any of embodiments 1-22, wherein the glass transition temperature of the polyacrylate base polymer ranges from −99° C. to −20° C. and the molecular weight of the polyacrylate base polymer ranges from 200,000 g/mol to 1,500,000 g/mol,
- wherein the polyacrylate base polymer is present in an amount ranging from 70 wt. % to 80 wt. %, based on the total solid weight of the pressure sensitive adhesive;
- wherein the glass transition temperature of the polyacrylate tackifier ranges from −35° C. to −50° C. and the molecular weight of the polyacrylate tackifier ranges from 10,000 g/mol to 300,000 g/mol,
- wherein the polyacrylate tackifier is present in an amount ranging from 1 wt. % to 10 wt. % based on the solid weight of the pressure sensitive adhesive; and
- wherein the metal chelating crosslinker is present in an amount of 0.1 wt. % to 5 wt. %.

Embodiment 25: The pressure sensitive adhesive of any of embodiments 1-24,
- wherein the glass transition temperature of the polyacrylate base polymer ranges from −50° C. to −40° C. and the molecular weight of the polyacrylate base polymer ranges from 350,000 g/mol to 450,000 g/mol;
- wherein the polyacrylate base polymer is present in an amount ranging from 92 wt. % to 98 wt. %.%, based on the total solid weight of the pressure sensitive adhesive;
- wherein the glass transition temperature of the polyacrylate tackifier ranges from −30° C. to 50° C. and the molecular weight of the polyacrylate tackifier ranges from 100,000 g/mol to 200,000 g/mol;
- wherein the polyacrylate tackifier is present in an amount ranging from 4 wt. % to 10 wt. % based on the solid weight of the pressure sensitive adhesive;
- wherein the metal chelating crosslinker is present in an amount ranging from 0.8 wt. % to 1.2 wt. %; and
- wherein the pressure sensitive adhesive demonstrates a peel strength of at least 11.7 N/inch to 30 N/inch on polyvinyl chloride, as measured by FINAT-1 (2018) and a static shear on stainless steel of 5,000 minutes to 15,000 minutes, as measured by FINAT-8 (2018).

Embodiment 26: The pressure sensitive adhesive of any of embodiments 1-25,
- wherein the glass transition temperature of the polyacrylate base polymer ranges from −50° C. to −40° C. and the molecular weight of the polyacrylate base polymer ranges from 350,000 g/mol to 450,000 g/mol;
- wherein the polyacrylate base polymer is present in an amount ranging from 92 wt. % to 98 wt. %.%, based on the total solid weight of the pressure sensitive adhesive;
- wherein the glass transition temperature of the polyacrylate tackifier ranges from −15° C. to −8° C. and the molecular weight of the polyacrylate tackifier ranges from 100,000 g/mol to 200,000 g/mol;
- wherein the polyacrylate tackifier is present in an amount ranging from 4 wt. % to 10 wt. % based on the solid weight of the pressure sensitive adhesive;
- wherein the metal chelating crosslinker is present in an amount ranging from 0.8 wt. % to 1.2 wt. %;
- wherein the pressure sensitive adhesive demonstrates a peel strength of at least 11.7 N/inch to 30 N/inch on polyvinyl chloride, as measured by FINAT-1 (2018) and a static shear on stainless steel greater than 5000 minutes, as measured by FINAT-8 (2018);
- wherein the pressure sensitive adhesive is capable of remaining attached to a substrate when the pressure sensitive adhesive has been subjected to a temperature ranging from −40° C. to 37° C. for a period of 0.5 hour to 10 years and
- wherein the pressure sensitive adhesive is capable of remaining attached to a substrate when the pressure sensitive adhesive is has been in contact with water for a period of 0.5 hour to 1 week.

Embodiment 27: A laminate composition comprising a facestock layer and a pressure sensitive adhesive layer comprising the pressure sensitive adhesive of any one of embodiments 1-26.

Embodiment 28: The laminate composition of embodiment 27, wherein the pressure sensitive adhesive layer has a thickness ranging from 8 μm to 80 μm.

Embodiment 29: The laminate composition of embodiment 27, wherein the facestock layer is a film comprising one or more resins selected from the group consisting of polyester, Polypropylene (PP), PP synthesis Paper, Polyvinyl chloride (PVC), ABS, polyacrylate, polycarbonate (PC), polyamide, polyimide (PI), polyamidoimide, polyacetal, polyphenylene oxide (PPO), polysulfone, polyethersulfone (PES), polyphenylene sulfide, polyether ether ketone (PEEK), polyetherimide (PE1), metallized polyethylene terephthalate (PET), polyvinyl fluoride (PVF), polyethylene ether (PEE), fluorinated ethylene propylene (FEP), polyurethane (PUR), liquid crystal polymers (LCPs, class of aromatic polyester), polyvinylidene fluoride (PVDF), aramid fibers, DIALAMY, (polymer alloys), polyethylene naphthalate (PEN), ethylene/tetrafluoroethylene, (E/TFE), and polyphenyl sulfone (PPSU).

Embodiment 30: The laminate composition of any of embodiments 27-29, wherein the laminate further comprises a topcoat layer disposed on top of the facestock layer.

Embodiment 31: A label comprising the pressure sensitive adhesive of any of embodiments 1-26 or the laminate composition of embodiments 27-30.

Embodiment 32: A process for producing a pressure sensitive adhesive, the process comprising: dissolving in a solvent a) a polyacrylate base polymer; b) a polyacrylate tackifier; and c) a metal chelating crosslinker to form a pressure sensitive adhesive solution.

Embodiment 33: The process of embodiment 32, wherein the solvent is selected from the group consisting of toluene, ethyl acetate, isopropanol, xylene, n-hexane, n-heptane, methyl cyclohexane, butyl acetate, acetone, butanone, and 2-Acetoxy-1-methoxypropane.

Embodiment 34: The process of any of embodiments 32-33, wherein the method further comprises the step of coating a facestock with the pressure sensitive adhesive solution, and drying the pressure sensitive adhesive solution to produce a label.

Embodiment 35: The process of any of embodiments 32-33, wherein the method further comprises the step of coating a release liner with the pressure sensitive adhesive solution, drying the pressure sensitive adhesive solution on release liner to produce a dried PSA/liner composition, and applying the dried PSA/liner composition to a facestock to produce a label.

Embodiment 36: The process of any of embodiments 34-35, wherein the method further comprises applying the label to an article to produce a labeled article, wherein the label is capable of remaining attached to the article after the labeled article has been kept under a temperature that ranges from −99° C. to 40° C. for a period at least 6 hours and/or the label is capable of remaining attached to the article after the label has been in contact with water for a period of at least 0.5 hour.

Embodiment 37: A process for applying a pressure sensitive adhesive to an article, the process comprising: applying the label produced from the process of embodiment 34 or 35 to the article at an application temperature equal to or less than −40° C.

Embodiment 38: The process of embodiment 36 or 37, wherein the article is a frozen blood product package Embodiment 39: The process of any of embodiments 36-38, wherein the glass transition temperature of the polyacrylate base polymer is less than the application temperature.

Embodiment 40: The process of any one of embodiment 36-39, wherein the pressure sensitive adhesive demonstrates a peel strength of at least 11.7 N/inch to 30 N/inch on polyvinyl chloride, as measured by FINAT Test Method 1 (2018) and a static shear on stainless steel greater than 8,000 minutes.

Embodiment 41: The process of any one of embodiments 36-40, wherein the pressure sensitive adhesive remains attached to the article after being subjecting to a temperature ranging from −40° C. to 40° C.

Embodiment 42: The process of any one of embodiments 37-41 wherein the pressure sensitive adhesive remains attached to the article after being in contact with water for a period of 0.5 hour to 1 month.

Embodiment 43: A pressure sensitive adhesive solution comprises the pressure sensitive adhesive of any of embodiments 1-26, and a solvent.

Embodiment 44: The pressure sensitive adhesive solution of embodiment 41, wherein the polyacrylate base polymer solution is present in an amount ranging from 60 wt. % to 90 wt. % based on the total weight of the pressure sensitive adhesive solution.

Embodiment 45: The pressure sensitive adhesive solution of embodiments 43-44, wherein the solvent is present in an amount ranging from 10 wt. % to 70 wt. % based on the total weight of the pressure sensitive adhesive solution.

EXAMPLES

The following examples are offered to illustrate, but not to limit the claimed invention.

Procedure I: Effect of Polyacrylate Tackifier

Three exemplary PSA solutions having the ingredients as listed in Table 2 were prepared. The values in Table 2 represent the weight percentages of the individual components based on the total weight of the PSA solution. The numbers in parentheses in the first column represent the percentages of the solid content in each component, which can be used to calculate the solid weight percentages of the components based on the solid weight of the PSA.

TABLE 1

Features and Sources of the Ingredients

| | MW (g/mol) | Glass transition temperature (°C.) | Souce |
|---|---|---|---|
| 3-4229 (Polyacrylate base polymer) | 390,000 | −42.5 | Taizhou Yade Adhesive Company (Zhejiang, P.R. China) |
| 247A (Polyacrylate tackifier) | 150,000 | −11 | Henkel (Düsseldorf, Germany) |
| BM-66 (Polyacrylate tackifier) | 40,000 | 50 | Pioneer Chemical (Shanghai, P.R. China), |
| NeoCryl ® B-804 (Polyacrylate tackifier) | 160,000 | 33 | NeoResins (DSM, Holland) |
| BM-61 (Polyacrylate tackifier) | | | Pioneer Chemical (Shanghai, P.R. China), |
| ETERAC EC-87 (a crosslinker of a triple aluminum chelating agent) | — | — | Eternal Chemical Ltd. (Kunshan, P.R. China) |
| GB-75(Rosin, 48%) | — | — | ARAKAWA (Shanghai, P.R. China) |

TABLE 2

Testing The Effects of The Polyacrylate Tackifiers

| | Example/Comparative | | | | |
|---|---|---|---|---|---|
| | Example 1 | Example 2 | Example 3 | Comp. A | Comp. B |
| Polyacrylate base polymer 3-4229 (41.5%) | 72 | 72 | 72 | 76.32 | 72 |
| Polyacrylate tackifier BM-66(30%) | — | 5.92 | 3.7 | — | — |
| Polyacrylate tackifier NeoCryl ® B-804(30%) | — | — | 5.92 | — | — |
| Polyacrylate tackifier 247A (48%) | 3.7 | — | — | — | — |
| GB-75(Rosin, 48%) | — | — | — | — | 3.7 |
| ETERAC EC-87 (a crosslinker of a triple aluminum chelating agent (4%)) | 7.9 | 7.9 | 7.9 | 7.9 | 7.9 |
| IPA | 0.8 | 0.8 | 0.8 | 0.8 | 0.8 |
| Toluene | 15.6 | 13.38 | 15.6 | 16.02 | 15.6 |
| Total | 100 | 100 | 100 | 100 | 100 |
| Labeling at −40° C., not wiping off the surface of the package | pass | Pass | Pass | Pass | No pass |
| Labeling at −40° C., wiping off the surface of the package | Pass | Pass | Pass | Pass | Pass |
| 37° C. water bath, 6 hr | Pass | Pass | Pass | No pass | No pass |
| Polyvinyl chloride (pvc), 180° peel | 13.8N/inch | 11.5N/inch | 15.3N/inch | 10.8N/inch | 11.6N/inch |
| Shear on SS (minutes) | >8000 | >8000 | >8000 | >8000 | 3000 |

Each of the PSA solutions was coated on a liner to dry. After drying, the liner/PSA is laminated with a facestock layer to form a laminate comprising the liner, the PSA, and the facestock, with the PSA being coated with the liner on one surface and with the facestock layer on the opposite surface (i.e., a laminate of liner/PSA adhesive/facestock).

The peel strength and static shear of the laminate comprising the PSA, the ability to adhere to blood packaged under ultra-low temperature, and the resistance of the PSA to warm water bath were tested according to methods as described below.

To test peel strength, the laminate comprising the PSA was cut into strips of 50 mm wide by 175 mm long. The release liners were peeled off the strips. The strips were bonded to the test plate by a single back-and-forth pass with a 2 kg roller. Twenty minutes after attachment, the peel strength (N/-25 mm wide) was measured following FINAT-1 test protocol at ambient temperature and a relative humidity of 50%. The measurements were obtained by using a tensile strength testing machine at a pull rate of 300 mm/min and a pull angle of 180° C. The peel force at a minimum of five readings at 10 mm intervals from the center of the each strip was recorded. The average of the five readings were reported as the peel strength for the PSA.

The static shear of the examples was evaluated as follows. A painted stainless steel panel having a width of 50 mm and 75 mm long was cleaned so that it was free of stains, discoloration, or scratches. During the whole procedure, caution was taken to avoid contacting the surface of the panel with fingers. The specimens were bonded to the test plate by a single back-and-forth pass with a 2 kg roller. The test specimens comprising the PSAs were centered on the test panel. The specimens were applied without added pressure to cover an area on the test panel that was 12.5 mm long and -12.5 mm wide. The specimens were left on the steel panel at ambient temperature for one day before applying a load of 0.5 kg on the specimen. The relative humidity during the test was 50%. The duration time of specimen on the steel panel was recorded for each specimen. the laminate comprising the PSA was cut into strips of 12.5 mm wide by 60 mm long. The release liners were peeled off the strips then were bonded to the centre of a 75 mm long and 50 mm wide clean stainless steel test panel by a single back-and-forth pass with a 2 kg roller. the covered area on stainless steel panel are 12.5 mm long and 12.5 mm wide. Twenty minutes after attachment, the shear strength was measured following FINAT-1 test protocol at ambient temperature and a relative humidity of 50%. The duration time of specimen on the steel panel was recorded for each specimen.

Resistance to warm water bath is performed by submerging the labeled blood packages in 37° C. water bath for 6 hours At the end of the 30-minute period, the blood packages were retrieved from the water bath and the labels thereon were inspected. If the label did not come off or lift off, the PSA was determined to be resistant to warm water bath (or performed well when in contact with warm water bath) and accorded a status of "pass".

The ability to label at ultra-low temperatures was tested on blood packages that has been stored in -40 C for at least one day. In one set of experiments, the blood packages were taken out, the frozen icy layer was first wiped off the surface, and the label comprising the PSA was applied to the surface of the blood package. In another set of experiments, the blood packages were taken out, without wiping, the label comprising the PSA was applied directly to the surface of the blood packages. In either set of experiments, if the labels did not come off or move relative to the blood package, the label is accorded a status of "pass".

The results for peel strength and shear were obtained from tests performed according to FINAT-1 (2018) and FINAT-8 (2018), respectively. "Pass" for labeling of the blood package under -40° C. means the label did not lift off the package or slipped while labeling. "Pass" for the 37° C. water bath, means that the label fixed onto blood bag did not come off or lift off, the label affixed to tubings on the blood packages do not stretch out or come off.

The results (see Table 2) show that the PSA of Examples 1-3 comprising 247A, BM-66, and a combination of BM-66 and polyacrylate tackifer Neocryl® B-804 as tackifiers, showed excellent performance in both labeling the surface of substrate under ultra-low temperatures, e.g., -40° C. or less, as well as in 37° C. water bath. 247A, BM-66, and Neocryl® B-804 are all polycrylate tackifiers, with glass transition temperatures being -11° C., 50° C., and 33° C., respectively. The PSA additionally showed a peel on PVC of 11.5 N/inch after a 20-minute attachment to the polyvinyl chloride test plate and a shear on stainless steel of greater than 8000 min on stainless steel at ambient temperature. The Comparative examples showed lower peel values and "no pass" for the water bath test. This indicates that having a polyacrylate as the tackifier in the PSA greatly increases the tack and the cohesiveness when the PSA is under ultra-low temperatures or in contact with water. These advantageous properties allow the use of the PSA in labeling articles (e.g., blood packages) which are used under both ultra-low temperatures and warm water bath, under which conditions conventional PSAs often fail to deliver good results.

Procedure II Effect of the Metal Chelating Crosslinker

Two additional comparative examples, Comp. C and Comp. D, were prepared from ingredients listed in Table 3 as described in Procedure II. The values in Table 3 represent the weight percentages of the individual components based on the total weight of the PSA solution. The numbers in parentheses in the first column represent the solid content in each component. Each of the PSA solutions was coated on a liner to dry. After dying, the liner was peeled off, and the dry PSA was transferred to a facestock to form a laminate. The peel strength and static shear of the laminate comprising the PSA, the ability to adhere to blood packaged under ultra-low temperature, and the resistance of the PSA to warm water bath was tested according to methods as described above. The results are shown in Table 3.

TABLE 3

Testing The Effect Of The Metal Chelating Crosslinker

| Name | Example 1 | Comp. C | Comp. D |
|---|---|---|---|
| 3-4229 (41.5%) | 72 | 72 | 72 |
| 247A (48%) | 3.7 | 3.7 | 3.7 |
| Metal chelating agent (4%) | 7.9 | — | — |
| Epoxy GY-240 (10%) | — | 3.2 | — |
| Aziridine, XR-2500 (10%) | — | — | 3.2 |
| IPA | 0.8 | — | — |
| Toluene | 15.6 | 21.1 | 21.1 |
| Total | 100 | 100 | 100 |
| Labeling at -40 C., not wiping off the surface of the package | Pass | Pass | No Pass |
| Labeling at -40 C., wiping off the surface of the package | Pass | Pass | Pass |
| 37° C. water bath 6 hours | Pass | No Pass | No Pass |
| Peel on pvc, 180° | 13.8N/inch | 8.2N/inch | 8.6N/inch |
| Shear on SS(minutes) | >8000 | 159 CP | 111 CP |

The results show that Example 1 comprising the metal chelating crosslinker, ETERAC EC-87 (a triple aluminum chelating agent) demonstrated excellent performance when used to label the surface of substrate under ultra-low temperatures, e.g., −40° C. or less, or when it is submerged in 37° C. water bath. In addition,
the PSA of Example 1 can be directly affixed to the package that has a temperature of −40° C. without the need of wiping the surface of the package in advance. In contrast, comparative examples C and D, comprising epoxy resin GY240 (Jiadida New Material company (Shenzhen China)) and aziridine, XR-2500 from Stahl Holdings B.V. (Waalwijk, the Netherlands), respectively, as the crosslinker for the PSA, were not able to remain attached to the blood packages after the blood packages were submerged in 37° C. water-bath. Unlike comparative examples C and D, which showed a peel strength of 8.2 N/inch and 8.6 N/inch, Example 1 demonstrated a much higher peel strength of 11.5 N/inch on pvc after a 20-minute attachment. The label additionally showed a static shear on stainless steel of greater than 8000 min, which is much higher than comparative examples C and D, which were 159 CP (the label fell off the stainless steel panel after 159 minutes) and 111 CP (the label fell off the stainless steel panel after 111 minutes), respectively. "CP" stands for "clear panel". This indicates that having a metal chelating agent as a crosslinker in the PSA significantly increases tack and cohesiveness, which results in the PSA's superior performance when subjected to low temperature or a warm water bath.

The invention has been described in detail, modifications within the spirit and scope of the invention will be readily apparent to those of skill in the art. In view of the foregoing discussion, relevant knowledge in the art and references discussed above in connection with the Background and Detailed Description are all incorporated herein by reference. In addition, it should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriate combined with other embodiments as will be appreciated by one of skill in the art. Furthermore, those of ordinary skill in the art will appreciate that the foregoing description is by way of example only, and is not intended to limit the invention.

We claim:

1. A pressure sensitive adhesive comprising:
a polyacrylate base polymer having a glass transition temperature,
a polyacrylate tackifier having a glass transition temperature, and
a metal chelating crosslinker,
wherein both the glass transition temperature of the polyacrylate tackifier and the glass transition temperature of the polyacrylate base polymer are lower than 90° C., and
wherein the glass transition temperature of the polyacrylate base polymer is lower than the glass transition temperature of the polyacrylate tackifier,
wherein the glass transition temperature of the polyacrylate base polymer ranges from −99° C. to −20° C. and wherein the glass transition temperature of the polyacrylate tackifier is greater than −30° C.

2. The pressure sensitive adhesive of claim 1, wherein the adhesive is a solvent-borne PSA.

3. The pressure sensitive adhesive of claim 1, wherein the glass transition temperature of the polyacrylate tackifier ranges from −30° C. to 90° C.

4. The pressure sensitive adhesive of claim 1, wherein the glass transition temperature of the polyacrylate base polymer ranges from −50° C. to −35° C.

5. The pressure sensitive adhesive of claim 1, the Tg of the polyacrylate base polymer is 5° C. to 100° C. lower than that of the polyacrylate tackifier.

6. The pressure sensitive adhesive of claim 1, wherein the molecular weight of the polyacrylate base polymer is greater than the molecular weight of the polyacrylate tackifier.

7. The pressure sensitive adhesive of claim 1, wherein the polyacrylate base polymer has a molecular weight ranging from 200,000 g/mol to 1,500,000 g/mol.

8. The pressure sensitive adhesive of claim 1, wherein the polyacrylate base polymer is present in an amount ranging from 30 wt. % to 99.9 wt. %, based on the total solid weight of the pressure sensitive adhesive.

9. The pressure sensitive adhesive of claim 1, wherein the polyacrylate base polymer and/or the polyacrylate tackifier comprise acrylic acid (AA), methyl acrylate (MA), butyl acrylate (BA), 2-ethyl hexyl acrylate (2-EHA), hydroxyethylacrylate (HEA), or combinations thereof.

10. The pressure sensitive adhesive of claim 1, wherein the polyacrylate tackifier has a molecular weight ranging from 10,000 g/mol to 300,000 g/mol.

11. The pressure sensitive adhesive of claim 1, wherein the polyacrylate tackifier is present in an amount ranging from 0.5 wt. % to 30 wt. %, based on the total solid weight of the pressure sensitive adhesive.

12. The pressure sensitive adhesive of claim 1, wherein the polyacrylate base polymer comprises less than 2 wt. % rosin resin, aziridine, or epoxy or combinations thereof.

13. The pressure sensitive adhesive of claim 1, wherein the pressure sensitive adhesive demonstrates a peel strength greater than 11.5N/inch 10N/inch on polyvinyl chloride, as measured by FINAT Test Method 1 (2018).

14. The pressure sensitive adhesive of claim 1, wherein the pressure sensitive adhesive demonstrates a shear ranging greater than 5,000 minutes on stainless steel according to FINAT 2018.

15. The pressure sensitive adhesive of claim 1, wherein the pressure sensitive adhesive has a peel strength on polyvinyl chloride ranging from 5 N/inch to 20 N/inch.

16. The pressure sensitive adhesive of claim 1, wherein the pressure sensitive adhesive is capable of remaining attached to a substrate when the pressure sensitive adhesive has been subjected to a temperature ranging from −99° C. to −20° C. for a period of 1 month to 10 years.

17. The pressure sensitive adhesive of claim 1, wherein the pressure sensitive adhesive is capable of remaining attached to a substrate when the pressure sensitive adhesive has been subjected to a temperature ranging from 20° C. to 40° C. for a period of 1 month to 10 years.

18. The pressure sensitive adhesive of claim 1, wherein the pressure sensitive adhesive is capable of remaining attached to a substrate when the pressure sensitive adhesive has been in contact with water for a period of 0.5 hour to 24 hours.

19. The pressure sensitive adhesive of claim 1, wherein the metal chelating agent is a triple aluminum having the structure of the formula below:

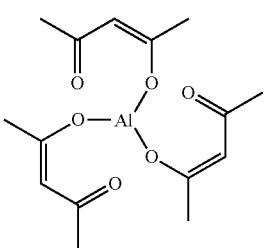

wherein the glass transition temperature of the polyacrylate tackifier ranges from −35° C. to −50° C. and the molecular weight of the polyacrylate tackifier ranges from 10,000 g/mol to 300,000 g/mol, wherein the polyacrylate tackifier is present in an amount ranging from 1 wt. % to 10 wt. % based on the solid weight of the pressure sensitive adhesive; and wherein the metal chelating crosslinker is present in an amount of 0.1 wt. % to 5 wt. %.

20. The pressure sensitive adhesive of claim 1, wherein the metal chelating agent is present in an amount ranging from 0.1 wt. % to 5 wt. %, based on the total solid weight of the pressure sensitive adhesive.

21. The pressure sensitive adhesive of claim 1, wherein the glass transition temperature of the polyacrylate base polymer ranges from −50° C. to −40° C. and the molecular weight of the polyacrylate base polymer ranges from 350,000 g/mol to 450,000 g/mol, and wherein the glass transition temperature of the polyacrylate tackifier ranges from −30° C. to 50° C. and the molecular weight of the polyacrylate tackifier ranges from 100,000 g/mol to 200,000 g/mol.

22. The pressure sensitive adhesive of claim 1, wherein the glass transition temperature of the polyacrylate base polymer ranges from −99° C. to −20° C. and the molecular weight of the polyacrylate base polymer ranges from 200,000 g/mol to 1,500,000 g/mol, wherein the polyacrylate base polymer is present in an amount ranging from 70 wt. % to 80 wt. %, based on the total solid weight of the pressure sensitive adhesive.

23. The pressure sensitive adhesive of claim 1, wherein the glass transition temperature of the polyacrylate base polymer ranges from −50° C. to −40° C. and the molecular weight of the polyacrylate base polymer ranges from 350,000 g/mol to 1,500,000 g/mol; wherein the polyacrylate base polymer is present in an amount ranging from 80 wt. % to 99.9 wt. %, based on the total solid weight of the pressure sensitive adhesive; wherein the glass transition temperature of the polyacrylate tackifier ranges from −30° C. to 50° C. and the molecular weight of the polyacrylate tackifier ranges from 10,000 g/mol to 300,000 g/mol; wherein the polyacrylate tackifier is present in an amount ranging from 0.5 wt. % to 10 wt. % based on the solid weight of the pressure sensitive adhesive; wherein the metal chelating crosslinker is present in an amount ranging from 0.8 wt. % to 1.2 wt. %; and wherein the pressure sensitive adhesive demonstrates a peel strength of at least 11.5 N/inch to 30 N/inch on polyvinyl chloride, as measured by FINAT-1 (2018) and a static shear on stainless steel of greater than 5000 minutes. as measured by FINAT-8 (2018).

24. The pressure sensitive adhesive of claim 1, wherein the glass transition temperature of the polyacrylate base polymer ranges from −50° C. to −40° C. and the molecular weight of the polyacrylate base polymer ranges from 350,000 g/mol to 450,000 g/mol;
wherein the polyacrylate base polymer is present in an amount ranging from 85 wt. % to 98 wt. %, based on the total solid weight of the pressure sensitive adhesive;
wherein the glass transition temperature of the polyacrylate tackifier ranges from −30° C. to 50° C. and the molecular weight of the polyacrylate tackifier ranges from 10,000 g/mol to 300,000 g/mol;
wherein the polyacrylate tackifier is present in an amount ranging from 0.5 wt. % to 10 wt. % based on the solid weight of the pressure sensitive adhesive;
wherein the metal chelating crosslinker is present in an amount ranging from 0.8 wt. % to 1.2 wt. %; and
wherein the pressure sensitive adhesive demonstrates a peel strength of at least 11.7 N/inch to 30 N/inch on polyvinyl chloride, as measured by FINAT-1 (2018) and a static shear on stainless steel is greater than 5000 minutes, as measured by FINAT-8 (2018);
wherein the pressure sensitive adhesive is capable of remaining attached to a substrate when the pressure sensitive adhesive has been subjected to a temperature ranging from −40° C. to 37° C. for a period of 0.5 hour to 10 years; and
wherein the pressure sensitive adhesive is capable of remaining attached to a substrate when the pressure sensitive adhesive has been in contact with water for a period of 0.5 hour to 1 month.

25. A laminate composition comprising a facestock layer and a pressure sensitive adhesive layer comprising the pressure sensitive adhesive of claim 1.

26. The laminate composition of claim 25, wherein the pressure sensitive adhesive layer has a thickness ranging from 8 μm to 80 um.

27. The laminate composition of claim 25, wherein the facestock layer is a film comprising one or more resins selected from the group consisting of polyester, Polypropylene (PP), PP synthesis paper, ABS, polyvinyl chloride (PVC), polyacrylate, polycarbonate (PC), polyamide, polyimide (PI), polyamidoimide, polyacetal, polyphenylene oxide (PPO), polysulfone, polyethersulfone (PES), polyphenylene sulfide, polyether ether ketone (PEEK), polyetherimide (PEI), metallized polyethylene terephthalate (PET), polyvinyl fluoride (PVF), polyethylene ether (PEE), fluorinated ethylene propylene (FEP), polyurethane (PUR), liquid crystal polymers (LCPs, class of aromatic polyester), polyvinylidene fluoride (PVDF), aramid fibers, DIALAMY, (polymer alloys), polyethylene naphthalate (PEN), ethylene/tetrafluoroethylene, (E/TFE), polyphenyl sulfone (PPSU).

28. The laminate composition of claim 25, wherein the laminate further comprises a topcoat layer disposed on top of the facestock layer.

29. A label comprising the pressure sensitive adhesive of claim 1.

30. A process for producing a pressure sensitive adhesive, the process comprising:
dissolving in a solvent
a) a polyacrylate base polymer;
b) a polyacrylate tackifier; and
c) a metal chelating crosslinker;
to form a pressure sensitive adhesive solution, wherein the glass transition temperature of the polyacrylate base polymer ranges from −99° C. to −20° C. and wherein the glass transition temperature of the polyacrylate tackifier is greater than −30° C.

31. The process of claim 30, wherein the solvent is selected from the group consisting of toluene, ethyl acetate, isopropanol, xylene, n-hexane, n-heptane, methyl cyclohexane, butyl acetate, acetone, butanone, and 2-Acetoxy-1-methoxypropane.

32. The process of claim 30, wherein the method further comprises the step of coating a facestock with the pressure sensitive adhesive solution, and drying the pressure sensitive adhesive solution to produce a label.

33. The process of claim 30, wherein the method further comprises the step of coating a release liner with the pressure sensitive adhesive solution, drying the pressure sensitive adhesive solution on release liner to produce a dried PSA/liner composition, and applying the dried PSA/liner composition to a facestock to produce a label.

34. The process of claim 32, wherein the method further comprises applying the label to an article to produce a labeled article, wherein the label is capable of remaining attached to the article after the labeled article has been kept under a temperature that ranges from −99° C. to 40° C. for a period at least 8 hours and/or the label is capable of remaining attached to the article after the label has been in contact with water for a period of at least 0.5 hour.

35. A process for applying a pressure sensitive adhesive to an article, the process comprising:
applying the label produced from the process of claim 32 to the article at an application temperature equal to or less than −40° C.

36. The process of claim 34, wherein the article is a frozen blood product package.

37. The process of claim 35, wherein the glass transition temperature of the polyacrylate base polymer is less than the application temperature.

38. The process of claim 35, wherein the pressure sensitive adhesive demonstrates a peel strength of at least 11.5N/inch to 30 N/inch on polyvinyl chloride, as measured by FINAT Test Method 1 (2018) and a static shear on stainless steel greater than 8000 minutes.

39. The process of claim 35, wherein the pressure sensitive adhesive remains attached to the article after being subjected to a temperature ranging from −40° C. to 40° C.

40. The process of claim 35, wherein the pressure sensitive adhesive remains applied to the article after being in contact with water for a period of 0.5 hour to 1 month.

41. A pressure sensitive adhesive solution comprises components of the pressure sensitive adhesive of claim 1, and a solvent.

42. The pressure sensitive adhesive solution of claim 41, wherein the polyacrylate base polymer solution is present in an amount ranging from 30 wt. % to 90 wt. % based on the total weight of the pressure sensitive adhesive solution.

43. The pressure sensitive adhesive solution of claim 41, wherein the solvent is present in an amount ranging from 10 wt. % to 70 wt. % based on the total weight of the pressure sensitive.

44. A label comprising the laminate composition of claim 25.

* * * * *